April 23, 1957 E. NYYSSONEN 2,790,131
POLYPHASE TRANSFORMER SYSTEM
Filed April 25, 1955 9 Sheets-Sheet 1

INVENTOR.
Einard Nyyssonen

April 23, 1957 E. NYYSSONEN 2,790,131
POLYPHASE TRANSFORMER SYSTEM
Filed April 25, 1955 9 Sheets-Sheet 2

INVENTOR.
Einard Nyyssonen

INVENTOR.
Einard Nyyssonen

April 23, 1957     E. NYYSSONEN     2,790,131
POLYPHASE TRANSFORMER SYSTEM
Filed April 25, 1955     9 Sheets-Sheet 6
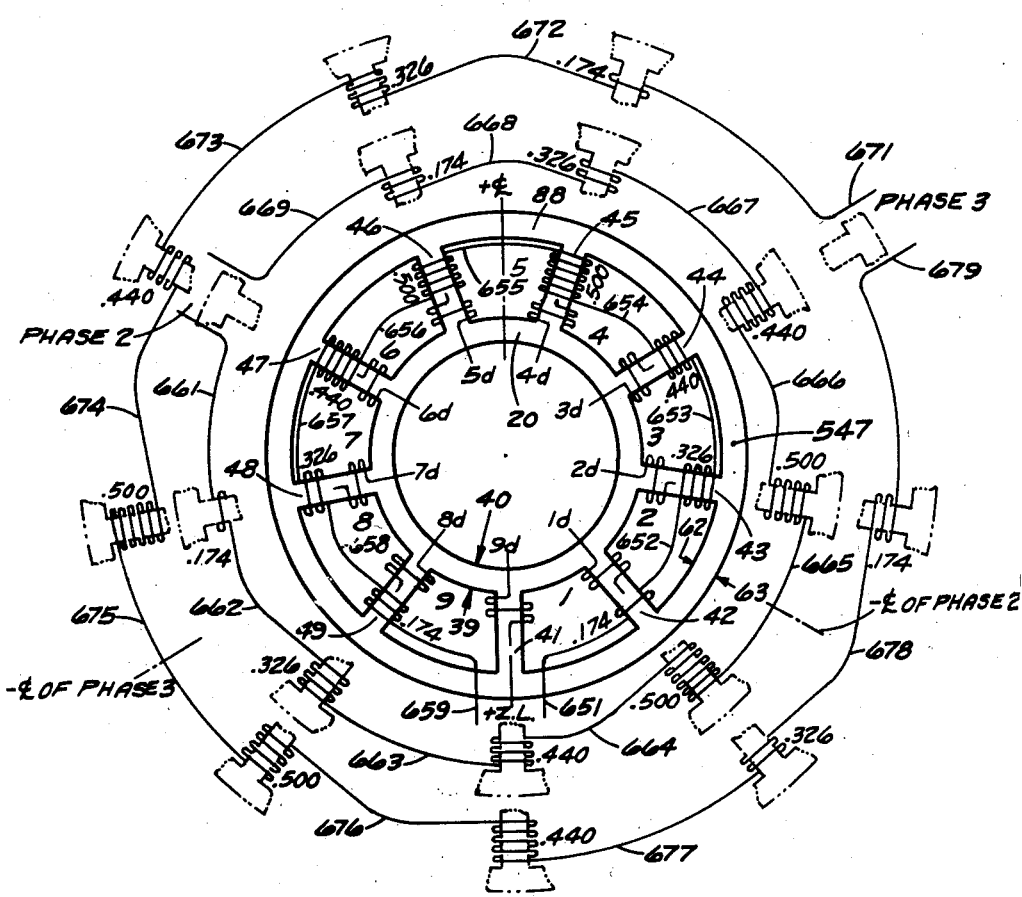
FIG. 11
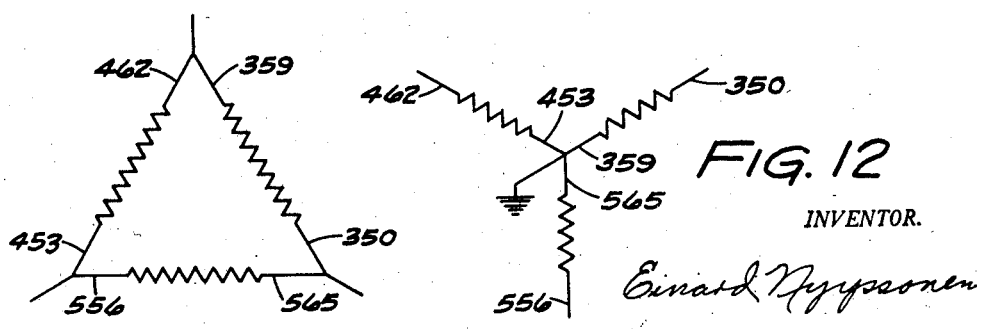
FIG. 12
FIG. 13
INVENTOR.
Einard Nyyssonen INVENTOR.
Einard Nyyssonen April 23, 1957 E. NYYSSONEN 2,790,131
POLYPHASE TRANSFORMER SYSTEM
Filed April 25, 1955 9 Sheets-Sheet 8

INVENTOR.
Einard Nyyssonen

INVENTOR.

United States Patent Office 2,790,131
Patented Apr. 23, 1957

2,790,131

POLYPHASE TRANSFORMER SYSTEM

Einard Nyyssonen, Watertown, Mass.

Application April 25, 1955, Serial No. 503,376

28 Claims. (Cl. 321—57)

The present invention relates to polyphase electromagnetic systems, and more particularly to polyphase transformer systems.

An object of the invention is to provide a new and improved transformer system, having magnetic circuits of alternately opposite polarity, that shall effect a transformation between a polyphase electric system of a large number of phases, which may or may not be sinusoidal, and a polyphase electric system, usually of a lesser number of substantially sinusoidal phases.

Another object of the present invention is to provide a polyphase electromagnetic system, of more general application, which, when provided with means for producing an assembly of magnetic circuits of alternately opposite polarity, shall effect a transformation between the said means and a polyphase electric system, usually of two or three substantially sinusoidal phases.

Still another object of the present invention is to provide a new and improved transformer system, similarly provided with magnetic circuits of alternately opposite polarity, that shall effect a transformation between two polyphase electric systems each of a large number of phases which may or may not be sinusoidal.

A further object of the present invention is to effect cancellation of detrimentally operating harmonics, particularly harmonics above the third.

Other and further objects will be explained hereinafter and will be more particularly pointed out in the appended claims.

Figure 1:
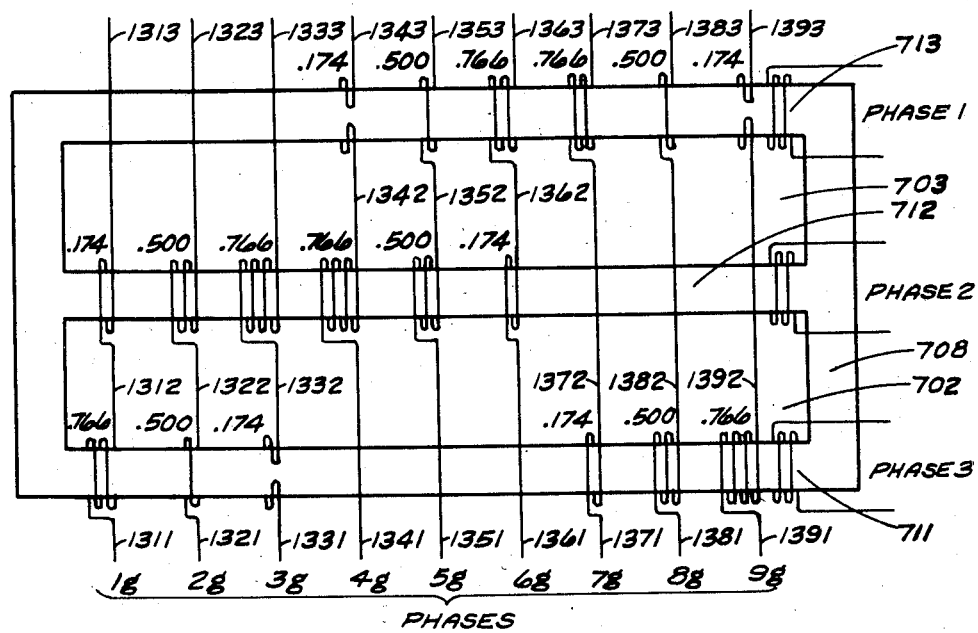
Figure 2:
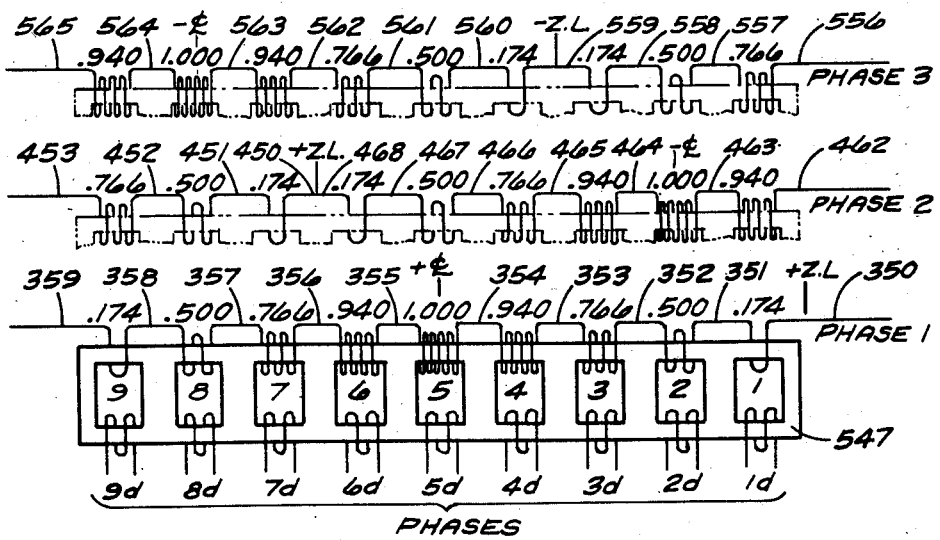
Figure 3:
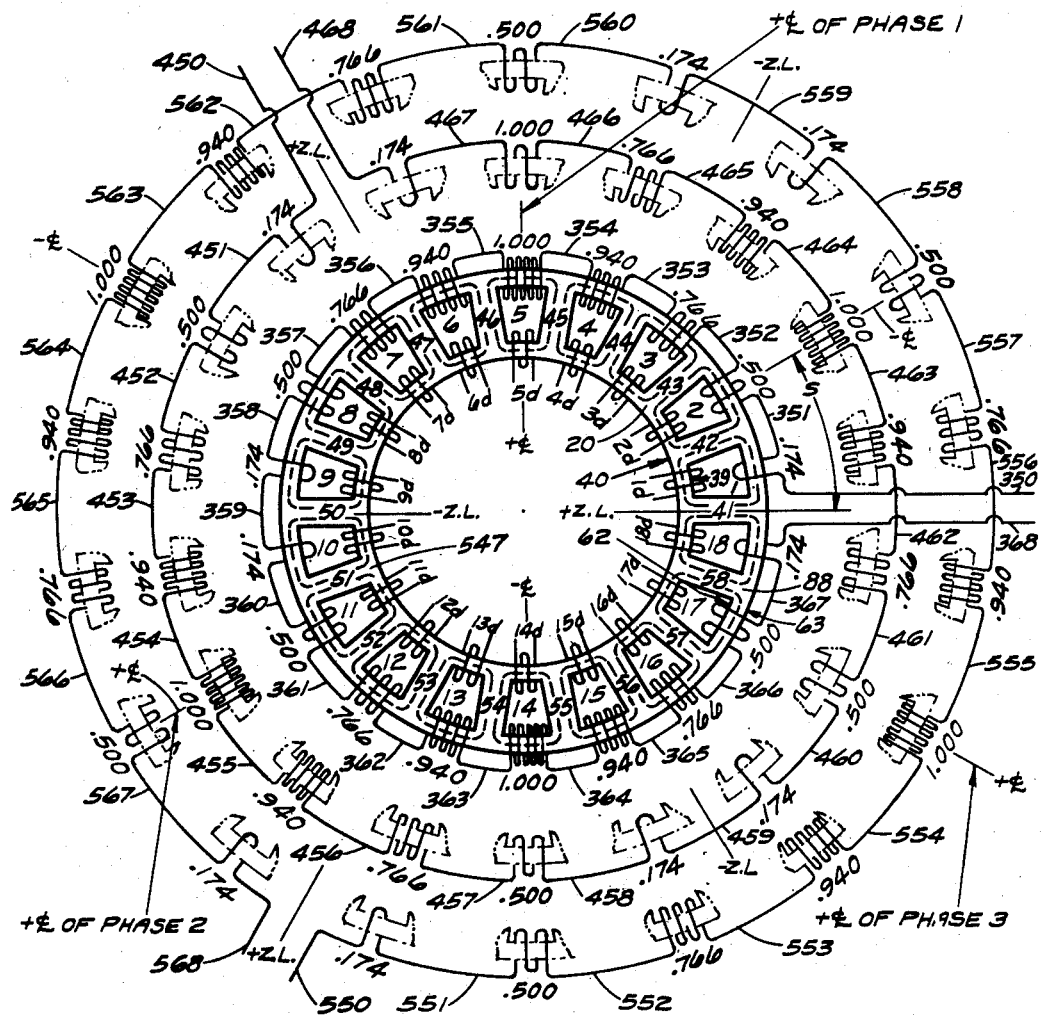
Figure 4:
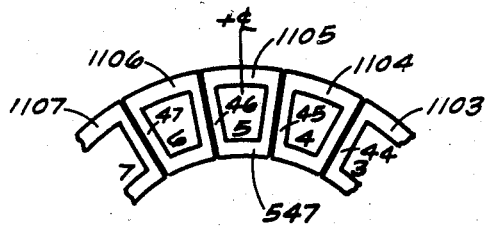
Figure 5:
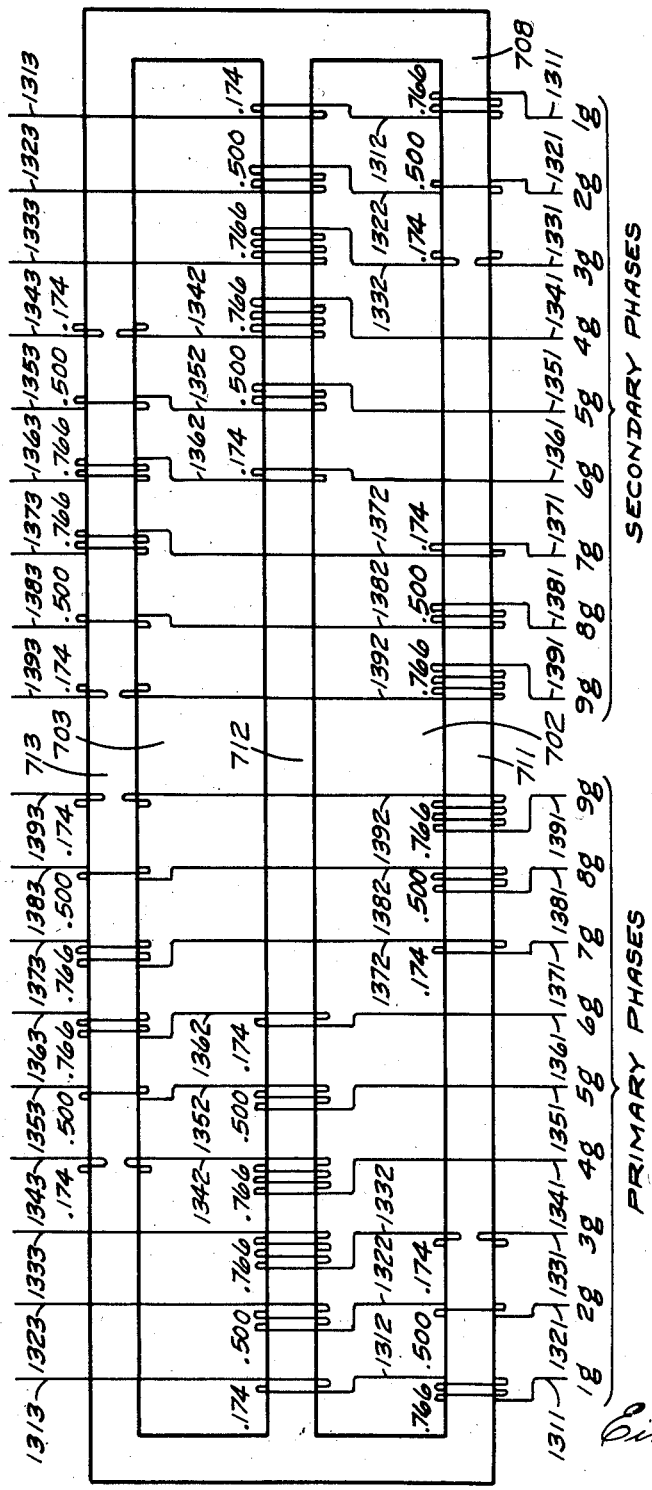
Figure 6:
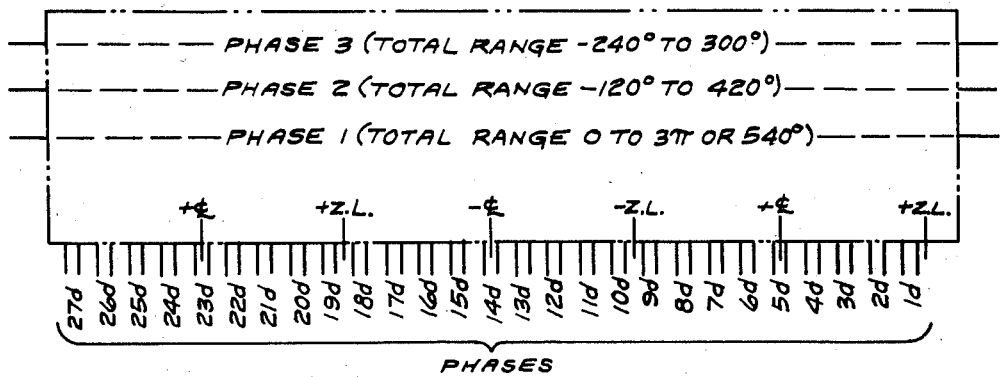
Figure 7:
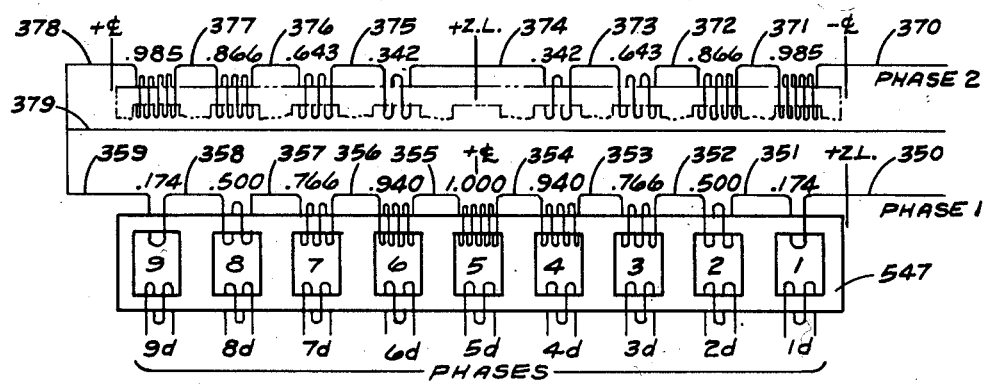
Figure 8:
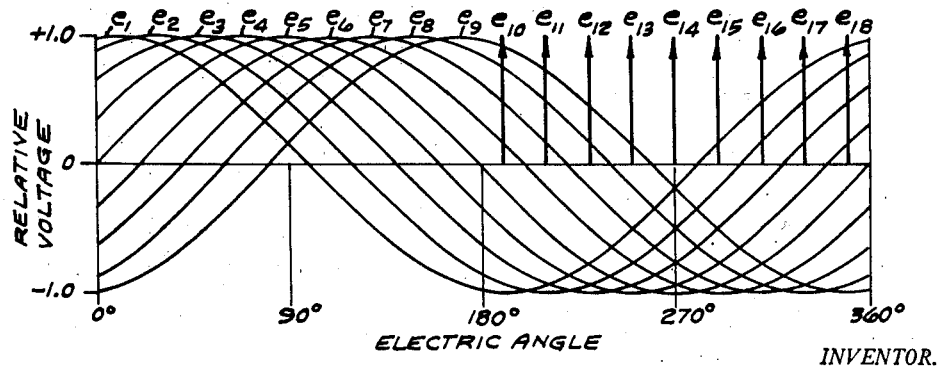
Figure 9:
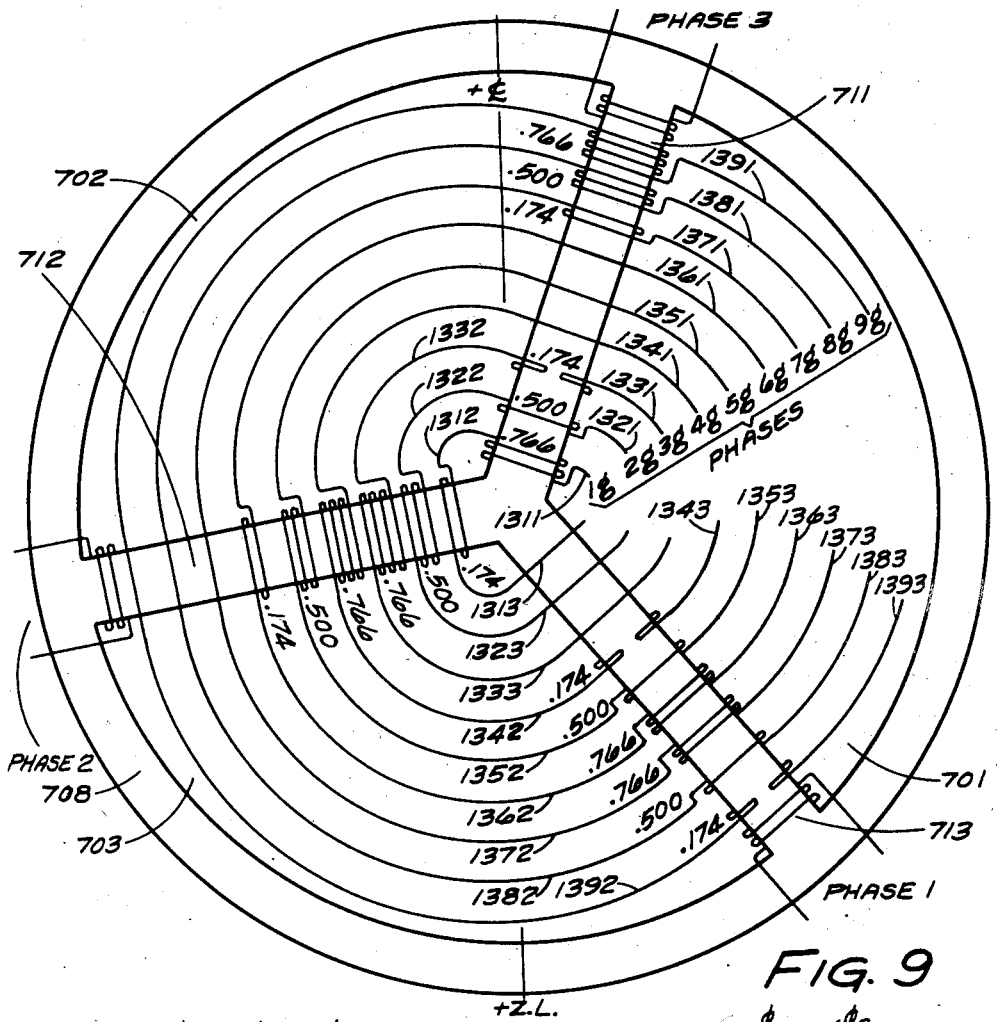
Figure 10:
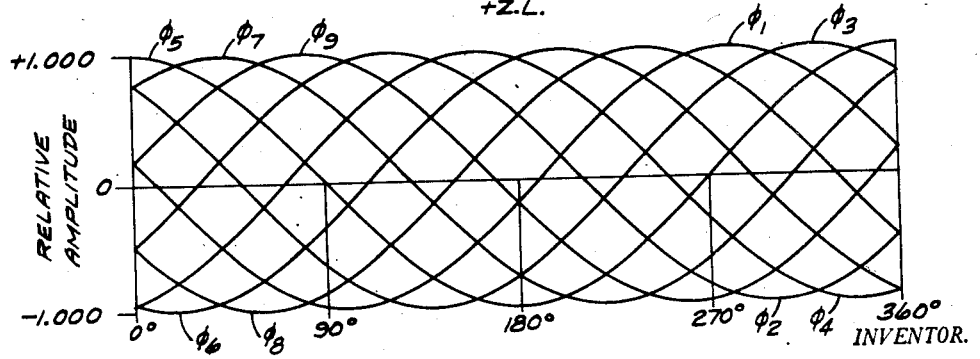
Figure 14:
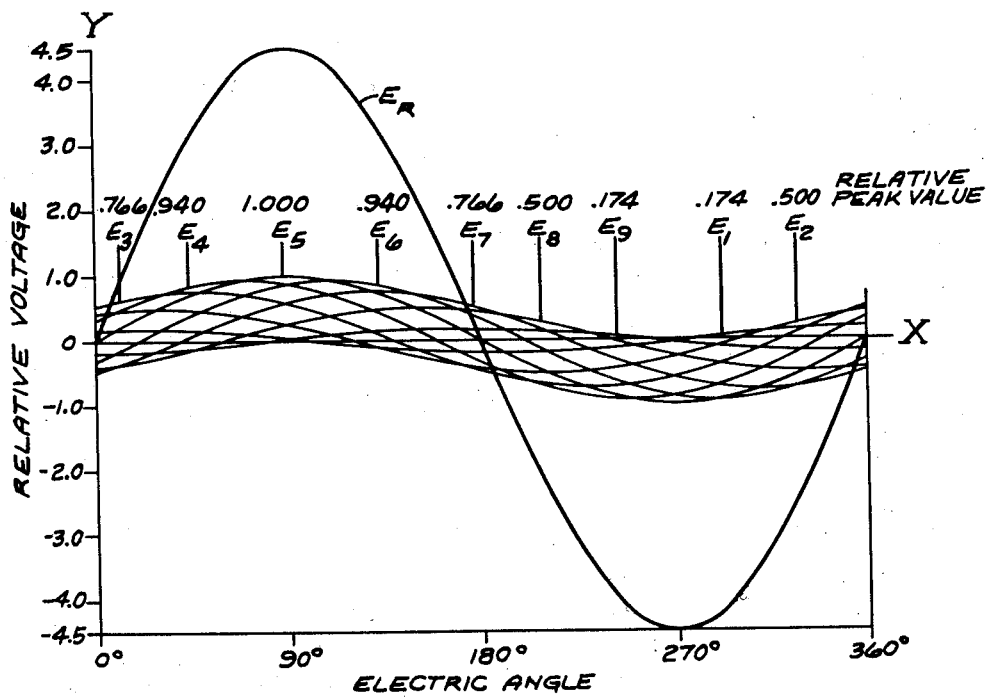
Figure 15:
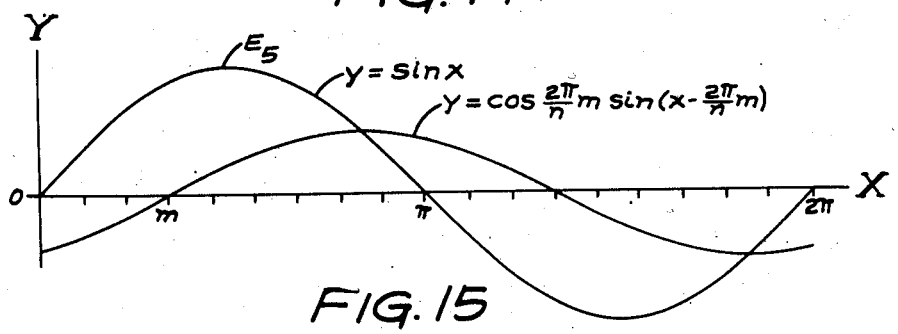
Figure 16:
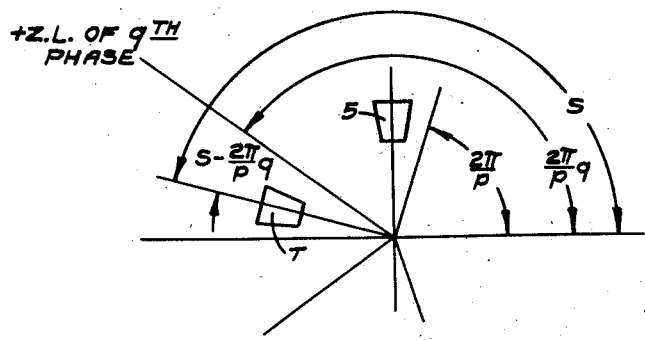
Figure 17:
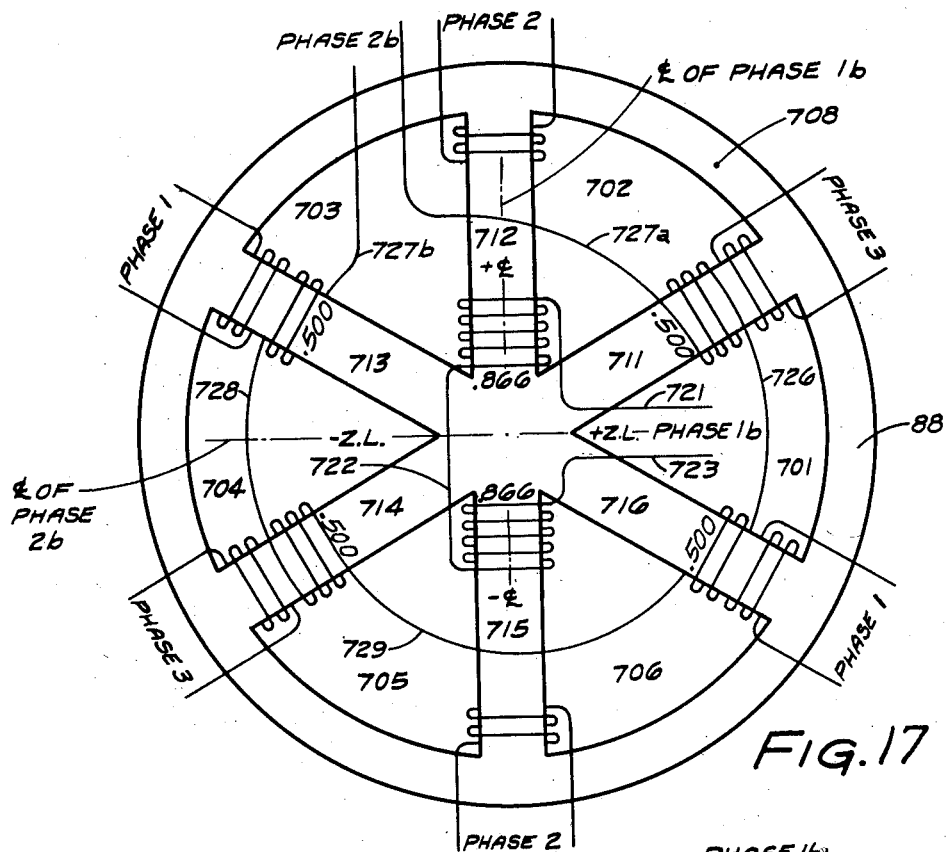
Figure 19:
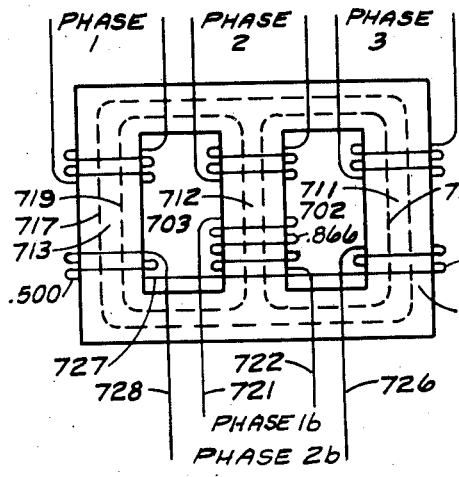
Figure 18:
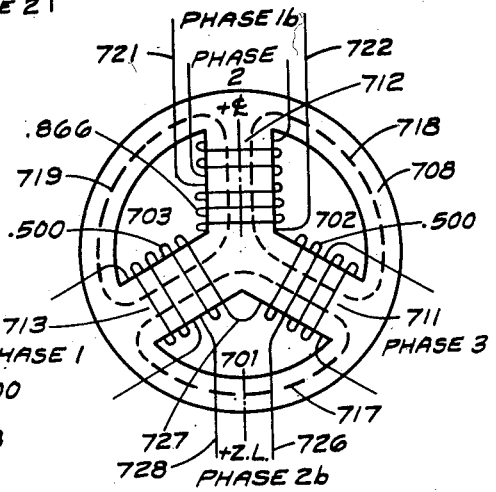
Figure 20:
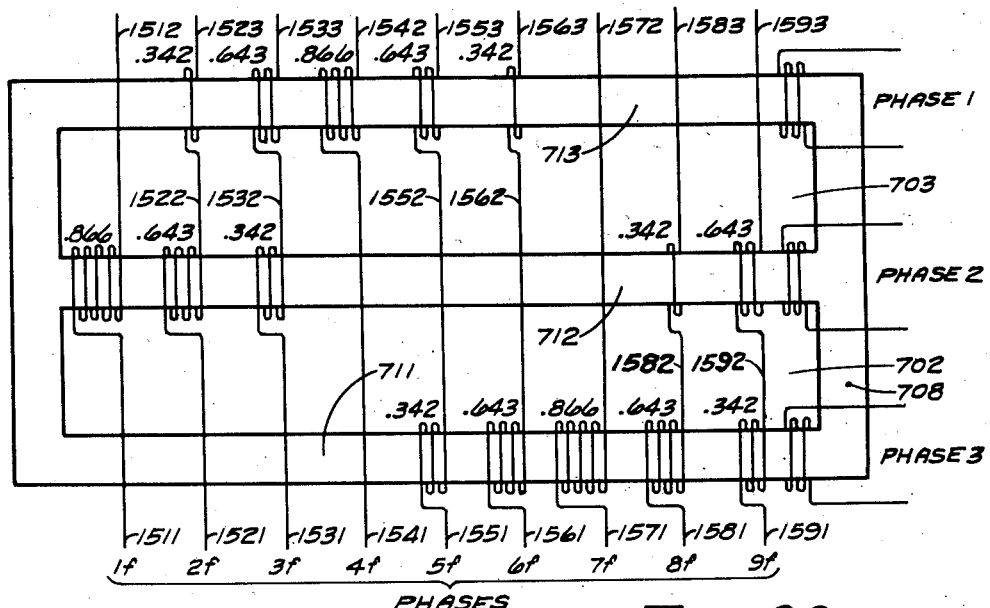
Figure 21:
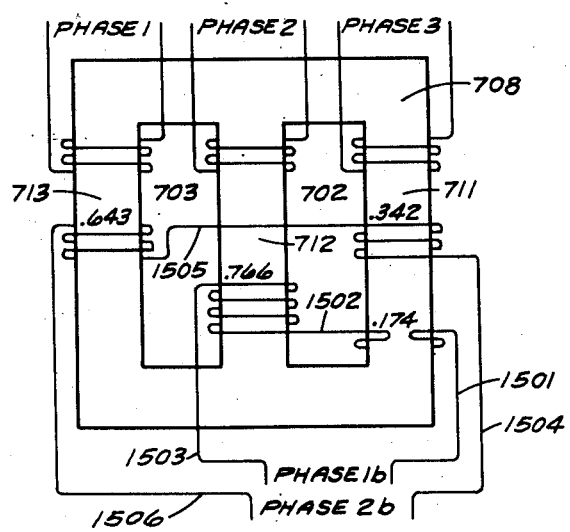

The invention will now be more fully explained in connection with the accompanying drawings, in which Fig. 1 is a schematic view illustrating diagrammatically, in simple form, for explanatory purposes, a transformer system embodying the invention, for transforming between a polyphase unsymmetrical electric system of nine phases and a symmetrical three-phase substantially sinusoidal electric system, the transformer system being shown provided with a three-phase transformer core theoretically embodying a single-collection assembly of three transformer-core slots; Fig. 2 is a similar schematic view of a modified transformer system for effecting the same transformation, provided with a magnetizable core embodying a single-collection assembly of nine transformer-core slots, the upper portion of the magnetizable core being shown three times, once by full lines and twice by dot-and-dash lines, in order to indicate diagrammatically that all three of the distributed single-phase windings of the three-phase winding are wound about the same upper fragmentary portion of the magnetizable core, though diagrammatically shown separated, for clearness; Fig. 3 is a similar schematic view of a transformer system similar to that of Fig. 2, but provided with a magnetizable core embodying a two-collection assembly of transformer-core slots, shown arranged geometrically along the circumference of a circle, in order the more easily to associate phase angles with geometric angles, as an aid to an understanding of the theory underlying the present invention; Fig. 4 is a fragmentary similar diagrammatic view illustrating a modified transformer-core structure; Fig. 5 is a schematic diagrammatic view, similar to the schematic views shown in Figs. 1 to 3, inclusive, illustrating diagrammatically a transformer system having a conventional rectangular-shaped three-phase transformer core, as also shown in Fig. 1, but provided with primary and secondary polyphase windings both similar to the nine-phase unsymmetrical winding shown in Fig. 1; Fig. 6 is a block diagram illustrating a transformer system similar to the transformer systems of Figs. 2 and 3, but provided with a magnetizable core embodying three collections of transformer-core slots; Fig. 7 is a schematic diagrammatic view of a single-collection-assembly transformer system similar to the transformer system shown in Fig. 2, but with a polyphase unsymmetrical winding having only two distributed phase windings, instead of a three-phase symmetrical polyphase winding; Fig. 8 is a diagram, in Cartesian coordinates, illustrating, disregarding the alternately opposite polarity, the alternating voltages, assumed to be sinusoidal, induced in unit conductor groups, each assumed to have a unit number of conductors, one disposed in each of the transformer-core slots illustrated in Figs. 2, 3 and 7; Fig. 9 is a schematic diagrammatic view of a transformer system similar to the transformer system of Fig. 1, but with a circular core, in order the more easily to associate phase angles with geometric angles, for purposes of explanation; Fig. 10 is a diagram, in Cartesian coordinates, illustrating, in their true polarity, the alternating magnetic fluxes, assumed to be sinusoidal, produced in the magnetic circuits encircling the transformer-core slots shown in Figs. 2 and 7; Fig. 11 is a schematic diagrammatic view of a single-collection-assembly transformer system similar to the transformer system shown in Fig. 2, but embodying a circular magnetizable core and modified primary and secondary distributed polyphase windings; Figs. 12 and 13 are diagrams illustrating Y and Delta connections, respectively, for the three-phase winding of Fig. 2; Fig. 14 is a diagram, in Cartesian coordinates, explanatory of the component voltages induced in the conductor groups of the distributed phase winding corresponding to phase 1 shown in Figs. 2, 3 and 7, when all the component voltages are assumed sinusoidal; Fig. 15 is a diagram illustrating, by means of curves, two of the sinusoidal voltage components of Fig. 14, for explanatory purposes; Fig. 16 is a diagram for facilitating the calculation of the magnetomotive forces; Fig. 17 is a schematic diagrammatic view of a transformer system similar to the transformer system shown in Fig. 9, but provided with a magnetizable core embodying a two-collection assembly of six transformer core slots and with a two-phase distributed winding disposed therein; Fig. 18 is a similar view, but illustrating the corresponding single-collection-assembly transformer system; Fig. 19 is a schematic diagrammatic view of a transformer system similar to the transformer system of Fig. 18, but provided with a conventional three-phase transformer core; Fig. 20 is a similar view of a transformer system similar to the transformer system of Fig. 1, but provided with a nine-phase sinusoidally distributed winding having a different geometric and electric orientation; and Fig. 21 is a similar view of a transformer system similar to the transformer system of Fig. 19, but provided with a two-phase sinusoidally distributed winding having a different geometric and electric orientation.

The polyphase transformer system of the present invention may be constituted of a magnetizable core and primary and secondary polyphase windings associated with that core. The magnetizable core may be laminated, as in other transformers, and it may be of conventional type or, as will presently be explained, it may be of special type. The primary and secondary polyphase windings associated with the magnetizable core may be suitably connected to respective primary and secondary polyphase electric systems.

In the lower portion of each of Figs. 2 and 7, the transformer system of the present invention is shown, by full lines, provided with a rectangular-shaped transformer core 547 having nine rectangular-shaped slots, constituting an assembly, equally spaced along a straight line. In Fig. 11, the transformer-core 547 is shown circular and the nine slots thereof are shown trapezoidal, equiangularly spaced along the circumference of a circle. In the central portion of Fig. 3, on the other hand, the transformer core is shown, also by full lines, of circular shape and provided with eighteen trapezoidal-shaped slots, also constituting an assembly, also equiangularly spaced along the circumference of a circle. In other figures, there are shown still other geometric configurations. The linear geometric arrangement of transformer-core slots illustrated in Figs. 2 and 7, the circular geometric arrangement of transformer-core slots of Figs. 3 and 11 and the other geometric configurations, however, are entirely without significance. In the practical applications of the invention, the transformer-core slots may be arranged in sequence according to any desired geometric pattern. The circular arrangement shown in Fig. 3 lends itself simply to associating phase angles with geometric angles, and to dealing with trigonometric functions. The linear arrangement shown in Figs. 2 and 7, on the other hand, represents a more practical form in which to embody the invention.

The transformer-core slots of Figs. 2, 7 and 11, for example, are shown at 1 to 9, and those of Figs. 3 at 1 to 18. In these Figs. 2, 3, 7 and 11, the transformer-core slots are shown all of the same size, all of the same rectangular or trapezoidal shape, and all surrounded or bounded by equal portions of the magnetizable core 547. The trapezoidal shape shown in Figs. 3 and 11 is essentially the same as the rectangular shape. The transformer-core slots are shown trapezoidal in Figs. 3 and 11, with the trapezoids tapering inwardly toward the center of the circle, merely for the purpose of compactness of showing in these Figs. 3 and 11.

The transformer-core slots are shown, in the circular arrangements of Figs. 3 and 11, separated by radial transformer-core sections, teeth or legs 41 to 58 and 41 to 49, respectively. The transformer-core slots of the rectangular-shaped cores of Figs. 2 and 7 are similarly shown separated by core sections, teeth or legs. In the circular arrangement of Figs. 3 and 11, each two adjacently disposed transformer-core slots are separated by a transformer-core section, tooth or leg, and each two adjacently disposed transformer-core sections, teeth or legs are separated by a transformer-core slot. The same is true also of the rectangular-shaped cores illustrated in Figs. 2 and 7. There is, of course, an exception to this statement in connection with the end transformer-core sections, teeth or legs of the rectangular-shaped core illustrated in Figs. 2 and 7.

The eighteen transformer-core slots 1 to 18 of Fig. 3 will be referred to as an assembly of two similar collections, each of nine transformer-core slots 1 to 9 and 10 to 18, respectively. The nine transformer-core slots 1 to 9 will be referred to as a positive collection of transformer-core slots, and the nine transformer-core slots 10 to 18 as a corresponding negative collection of transformer-core slots. The transformer-core slots 5 and 14 will be referred to as the central transformer-core slots of the respective positive and negative collections of transformer-core slots 1 to 9 and 10 to 18.

The assembly of transformer-core slots 1 to 9 of Figs. 2, 7 and 11, of course, is constituted of only a single collection of nine transformer-core slots.

Each of the transformer-core slots 1 to 18 is encircled by a magnetic circuit energized with alternating magnetic flux initially through the action of the primary current. These magnetic circuits are represented diagrammatically in Fig. 3 by means of single dashed lines. The magnetic circuit encircling the transformer-core slot 5, for example, comprises the two adjacently disposed radial sections, teeth or legs 45 and 46, a part of the outer peripheral portion 88, and a part of the inner peripheral portion 20 of the transformer core 547.

The magnetic circuits encircling the transformer-core slots 1 to 18 of Fig. 3 will likewise be referred to as an assembly of two similar collections, each of nine magnetic circuits. The collection of nine magnetic circuits respectively encircling the positive collection of transformer-core slots 1 to 9 will be referred to as the positive collection of magnetic circuits and the collection of nine magnetic circuits respectively encircling the negative collection of transformer-core slots 10 to 18 as the corresponding negative collection.

The collection of transformer-core slots 1 to 9, shown linearly arranged in Figs. 2 and 7 and circularly arranged in Fig. 11, and the collection of magnetic circuits respectively encircling them, may also be referred to as assemblies of transformer-core slots and transformer magnetic circuits, respectively, each assembly comprising only a single collection.

As will appear hereinafter, the transformer system of the present invention is not restricted to use with an assembly of only one or two collections of transformer-core slots and transformer magnetic circuits. The assembly may comprise also three, four or any other convenient number of collections of transformer-core slots and transformer magnetic circuits.

The magnetizable core 547 of Fig. 3 is shown provided with a polyphase winding comprising eighteen phase windings 1d to 18d respectively wound through the transformer-core slots 1 to 18 around the inner peripheral portion 20 of the magnetizable core 547 included between the inner circular periphery 40 and the inner boundaries 39 of these transformer-core slots. In Figs. 2 and 7, the nine phase windings 1d to 9d are shown similarly wound through the respective transformer-core slots 1 to 9 around the corresponding portion of the magnetizable core 547. These eighteen phase windings 1d to 18d are illustrated as like phase windings, identical in all respects, each having two terminals, and all provided with the same number of conductors or turns. They may be referred to as individual concentrated phase windings, to distinguish them from the hereinafter more fully described distributed phase windings. For purposes of theory only, the phase windings 1d to 18d are shown wound in alternately opposite directions from transformer-core slot to transformer-core slot. In the practical machine, the same result would be obtained simply by reversing the connections to alternately disposed members of these phase windings 1d to 18d.

As will be explained later, the operation of the transformer system of the present invention is reversible. The windings 1d to 18d may therefore function either as primary or secondary windings. For the present, however, the windings 1d to 18d will be regarded as the primary windings.

The nine phase windings 1d to 9d of Figs. 2 and 7 and the eighteen phase windings 1d to 18d of Fig. 3 may be excited from respective polyphase input-supply systems, not shown, of nine and eighteen alternating or cyclically varying phases of equal amplitude that are substantially equally phase-displaced over a total range of phase displacement of $\pi$ or 180 degrees and $2\pi$ or 360 degrees, respectively. The phase displacement of adjacently disposed windings 1d to 18d, therefore, is 20 electric degrees, and the displacement of diametrically oppositely disposed windings of Fig. 3 is $\pi$ or 180 degrees. The $\pi$ or 180 degree phase displacement arises from the progressive phase displacement of the windings 1d to 18d, and not from a change in the polarity or the direction of the windings. Resulting from the alternately opposite direction of winding or of connection, the phase displacement of the currents supplied to adjacently disposed transformer-core slots by the windings, on the other hand, is 20 plus $\pi$ or 180 or 200 electric degrees, and the currents supplied to diametrically oppositely disposed transformer-core slots of Fig. 3 are of the same phase. In the latter case, the $\pi$ or 180 degree phase difference of the diametrically oppositely disposed windings is cancelled by their opposite directions of winding.

The alternating currents respectively supplied to the transformer-core slots 1 to 18 by the respective phase windings 1d to 18d, being of alternately opposite polarity and phase-displaced only 20 electric degrees from transformer-core slot to transformer-core slot, produce alternating magnetic fluxes in the magnetizable core 547 that are confined to substantially independent magnetic circuits which respectively encircle the transformer-core slots 1 to 18. A system of magnetic circuits is thus produced that is stationary with respect to the magnetizable core 547. As previously explained, these magnetic circuits are diagrammatically represented in Fig. 3 by means of single dashed lines.

Similarly, in the single-collection assembly of Figs. 2 and 7, the supplied currents produce alternating magnetic fluxes in the magnetic circuits respectively encircling the transformer-core slots 1 to 9 that are phase-displaced 20 plus $\pi$ or 180 or 200 magnetic degrees from magnetic circuit to magnetic circuit of the single-collection assembly of magnetic circuits. In Fig. 11, wherein the transformer-core slots 1 to 9 are shown in a circular arrangement, the same is true also of the alternating magnetic fluxes produced in the adjacently disposed transformer-core slots 1 and 9.

The magnetic energy or magnetic flux, of either the single-collection assembly of Figs. 2 and 7 or the two-collection assembly of Fig. 3, will be referred to herein as a magnetic pattern. It represents the aggregate of an assembly of one or more collections of individual alternating magnetic fluxes, each collection being associated with a total range of phase displacement, disregarding the alternately opposite polarity, of substantially $\pi$ or 180 magnetic degrees.

According to the modification of the invention illustrated by Fig. 4, the magnetic circuits encircling the transformer-core slots 1 to 18, instead of being provided in a core which is continuous throughout the circumference, are respectively confined to separated laminated core sections five of which, respectively encircling the transformer-core slots 3 to 7, are respectively shown at 1103 to 1107. Whether or not air gaps between the sectors are employed, the respective magnetic circuits are substantially complete in themselves, and independent of one another.

Magnetomotive forces and corresponding magnetic fluxes having a similar total range of phase displacement may be obtained with any like windings, equal in number to the number of magnetic circuits, equiangularly spaced throughout the periphery. For example, in Fig. 11, the like phase windings 1d to 18d are each shown disposed, not in a separate transformer-core slot, as illustrated in Figs. 2, 3 and 7, but in two adjacently disposed transformer-core slots, thereby encircling the radial transformer-core section, tooth or leg disposed between these adjacently disposed transformer-core slots. The phase winding 1d, for example, is disposed in the transformer-core slots 1 and 2, thereby encircling the radial transformer-core section, tooth or leg 42, and the phase winding 2d is similarly disposed in the transformer-core slots 2 and 3, thereby encircling the radial transformer-core section, tooth or leg 43. Two adjacently disposed phase windings are therefore disposed in each transformer-core slot.

For the purpose of comparing, in other respects, the relative merits of disposing each of the phase windings 1d to 18d in a separate slot, as illustrated by Figs. 2, 3 and 7, and two adjacently disposed transformer-core slots, as illustrated by Fig. 11, it will be assumed that the same number of conductors is disposed in each transformer-core slot in each of these arrangements. Assuming that the phase windings 1d to 18d are all alike, therefore, they will each have half as many turns in the arrangement of Fig. 11 as in that of Figs. 2, 3 and 7. For diagrammatic purposes, each of the phase windings is shown in Fig. 11 composed of two turns, thereby providing four conductors in each transformer-core slot.

The magnetomotive forces produced in the transformer-core slots 1 to 9 of Fig. 11 are exactly the same as the magnetomotive forces produced in the transformer-core slots 1 to 9 of Figs. 2, 3 and 7, though half the magnetomotive force produced in each transformer-core slot of Fig. 11 is provided by each of the two phase windings disposed therein. Since the two magnetomotive-force contributions to each transformer-core slot are displaced 20 degrees, the magnetomotive forces produced in the transformer-core slots 1 to 9 of Fig. 11 are displaced 10 degrees and they are smaller, although by a very small amount, than the magnetomotive forces produced in the transformer-core slots 1 to 9 of Figs. 2, 3 and 7. From a practical viewpoint, either arrangement provides magnetomotive forces of substantially the same peak amplitude, and, disregarding the alternately opposite polarity, these magnetomotive forces are equally phase displaced over a total range equal to $\pi$ or 180 degrees.

Owing to the fact that the primary windings 1d to 18d of Figs. 2, 3, 7 and 11 are all alike, the primary currents produce substantially like magnetomotive forces in the transformer-core slots within the respective magnetic circuits. These substantially like magnetomotive forces respectively energize the magnetic circuits with alternating magnetic flux of the same wave form and the same peak amplitude. For present introductory purposes, it will be assumed that these alternating magnetic fluxes are sinusoidal, resulting from sinusoidally impressed voltages upon the primary windings 1d to 18d.

Relative sinusoidal values of the alternating magnetic energy or fluxes encircling the transformer-core slots 1 to 18 will be plotted in Cartesian coordinates. The relative unity or 1.000 peak value of the sine function may represent the peak value attained by each of these alternating magnetic fluxes.

The alternating magnetic fluxes, assumed to vary sinusoidally, of the magnetic circuits encircling the transformer-core slots of the positive collection of transformer-core slots 1 to 9 of Fig. 3, or the single collection of transformer-core slots 1 to 9 of Figs. 2, 7 and 11, are represented in Fig. 10, in their true polarity, by the curves $\phi_1$ to $\phi_9$. The origin of coordinates is so chosen, in Fig. 10, that, at a particular instant of time, representing the zero-degree magnetic angle, the positive relative peak amplitude, assumed unity or 1.000, of the curve $\phi_5$, representing the alternating magnetic flux of the magnetic circuit encircling the centrally disposed transformer-core slot 5, lies on the axis of ordinates. The alternating magnetic fluxes of the magnetic circuits encircling diametrically opposed transformer-core slots, representing the negative collection of transformer-core slots of the two-collection assembly of Fig. 3, are duplicates. The magnetic flux of the magnetic circuit encircling the transformer-core slot 10, as an illustration, is precisely the same as the magnetic flux of the magnetic circuit encircling the transformer-core slot 1, and it is represented by the same curve $\phi_1$.

A feature of the present invention resides in an electromagnetic system comprising the heretofore-described assembly of collections of magnetic circuits and a novel distributed polyphase winding which, as will be explained hereinafter, may be provided with two, three, or any other desired number of distributed phase windings. This feature of the invention is not necessarily restricted to a transformer system and, therefore, it may or may not be employed in combination with a further polyphase winding, such as, for example, the polyphase winding comprising the concentrated phase windings 1d to 18d described above.

The distributed phase windings of the distributed polyphase winding are illustrated as comprising conductors or turns wound in the transformer-core slots around respective portions of the transformer core 547. Only those portions of the conductors or turns that are disposed inside the transformer-core slots, of course, are effective for voltage-inducing purposes. The function of the remaining parts of the conductors or turns, on the outside of the respective transformer-core slots, is merely to complete the electric connections between the portions of the conductors or turns inside the transformer-core slots. It will conduce to clarity, during the theoretical discussion, to refer merely to the number of conductors of each distributed phase winding disposed in each transformer-core slot. For definiteness, the conductors of any distributed phase winding disposed in one particular transformer-core slot may be referred to as a conductor group.

For the present, it will be assumed that this polyphase winding is the secondary polyphase winding and, accordingly, the distributed phase windings and the conductor groups thereof will be referred to as distributed secondary phase windings and secondary-winding conductor groups, respectively.

In Figs. 2, 3, 7 and 11, only the conductor groups of the first or phase 1 distributed secondary phase winding are shown wound directly on the full-line transformer core 547. The conductor groups of the additional distributed secondary phase windings are shown diagrammatically, for clearness, wound in the transformer-core slots of dot-and-dash or phantom-core fragments, separate from the full-line transformer core. In Figs. 2, 3 and 11, the transformer core 547 is therefore shown three times, to correspond to three phases. In Fig. 7, it is similarly shown twice, to correspond to two phases. This showing, however, is for purposes of clarity only, in order not to introduce confusion into the drawings. In actual practice, of course, the respective conductor groups, associated with all the distributed secondary phase windings, are wound in the same transformer-core slots 1 to 18 of the same transformer core 547.

Each distributed phase winding of the present invention comprises conductor groups, one disposed in each transformer-core slot, and the number of conductors of the conductor groups varies from slot to slot of the assembly of transformer-core slots. The fact that the number of conductors or turns comprising the conductor groups disposed in the transformer-core slots varies from transformer-core slot to transformer-core slot is diagrammatically indicated in the drawings in various ways. It is indicated either by numbers, not greater than unity or 1.000, or by showing the conductor groups or windings disposed in some of the transformer-core slots as containing more conductors or turns than other conductor groups or windings disposed in other transformer-core slots.

In Figs. 2, 3, 7, 11 and other figures, the conductor groups are shown provided by coils or windings disposed in the various transformer-core slots 1 to 18. The coils or windings, like the conductor groups previously described, are indicated by decimal fractions which also indicate the relative numbers of turns of these coils or windings. As each conductor group may be constituted of more than one coil or winding, the relative number of conductors of a conductor group is necessarily the sum of the relative numbers of turns of the coils or windings of which that conductor group is constituted.

The numbers of conductors of the conductor groups of the phase 1 distributed phase winding are shown varying substantially as the absolute or positive values of the sine function over an angular range equal to $\pi$ or 180 degrees times the number of collections of transformer-core slots. The numbers of conductors of the conductor groups of the other distributed phase windings are shown varying in a similar manner, but the respective angular ranges of the said sine function are displaced by angular amounts substantially equal to the phase displacement of the respective phase windings. Improved performance may, however, be obtained even though the conductors of the conductor groups are not distributed strictly according to the sine function. The distribution may, for example, be in accordance with substantially the absolute or positive values of other alternating functions the values of which, like the values of the sine function, progressively: first, increase from zero to a maximum in the interval zero to $\pi/2$ or 90 degrees; then decrease, through zero to a minimum in the interval $\pi/2$ or 90 degrees to $3\pi/2$ or 270 degrees; and, finally, increase again to zero in the interval $3\pi/2$ or 270 degrees to $2\pi$ or 360 degrees.

In the two-collection assembly of Fig. 3, the points on the circumference where the numbers of conductors of the conductor groups of the phase 1 distributed phase winding are theoretically proportional to the values of the sine of 0, $\pi/2$ or 90, $\pi$ or 180, and $3\pi/2$ or 270 degrees are indicated by the radial reference lines +Z.L., + ₵, —Z.L. and — ₵, respectively. These radial reference lines will be referred to respectively as the positive reference zero line, the positive reference center line, the negative reference zero line and the negative reference center line. The reference zero lines +Z.L. and —Z.L. of the phase 1 distributed phase winding are respectively disposed midway between the transformer-core slots 18 and 1 and 9 and 10, and the reference center lines + ₵ and — ₵ thereof are alined radially with the respective central transformer-core slots 5 and 14.

In the single-collection assembly of Figs. 2 and 7, the numbers of conductors of the conductor groups of the phase 1 distributed phase winding are shown varying from right to left substantially as the absolute or positive values of the sine function over the angular range 0 to $\pi$ or 180 degrees, rather than 0 to $2\pi$ or 360 degrees, and the points where the numbers of conductors of the conductor groups are theoretically proportional to the sine of 0 and $\pi/2$ or 90 degrees are respectively indicated by the positive reference zero line +Z.L., disposed to the right of the transformer core 901, and the positive reference center line + ₵ alined with the central transformer core 905 and its slot 5. The reference zero and center lines Z.L. and ₵, respectively, have the same significance in Figs. 2 and 7 as in Fig. 3.

With this selection of reference lines, the numbers of conductors of the phase 1 distributed phase winding disposed in the positive collection of transformer-core slots 1 to 9 of Figs. 2, 3 and 7 and the negative collection of transformer-core slots 10 to 18 of Fig. 3 are respectively proportional to 0.174, 0.500, 0.766, 0.940, 1.000, 0.940, 0.766, 0.500 and 0.174, the absolute or positive values of the sine of the progressively increasing angles 10, 30, 50, 70, 90, 110, 130, 150 and 170 degrees, corresponding to the positive collection, and 190, 210, 230, 250, 270, 290, 310, 330 and 350 degrees, corresponding to the negative collection. In the two-collection assembly of Fig. 3, these angles are equal to the angles subtended by the respective transformer-core slots 1 to 18 at the center of the circle, measured counterclockwise from the positive reference zero line +Z.L. They may therefore be referred to as slot angles. The slot angle of the transformer-core slot 2 of Fig. 3, for example, is marked "S."

More generally, the conductors of the phase 1 distributed phase winding are proportional to the sine of phase-sequence angles measured, disregarding the alternately opposite polarity, with respect to a reference phase which corresponds to the positive reference zero line +Z.L. In Figs. 2, 3 and 7, disregarding the alternately opposite polarity, this reference phase is the phase midway between the phases of the alternating magnetic fluxes of the magnetic circuits encircling the transformer-core slots 18 and 1. It may be termed a positive reference phase, and it may be associated with a phase-sequence angle of zero degrees. Disregarding the alternately opposite polarity, the alternating magnetic fluxes of the magnetic circuits encircling the transformer-core slots 1 to 18 being respectively 10, 30, 50, 70, 90, 110, 130, 150, 170, 190, 210, 230, 250, 270, 290, 310, 330 and 350 magnetic degrees behind the positive reference phase, the transformer-core slots 1 to 18 may be associated with phase-sequence angles which are respectively the same as the previously described geometric-sequence or slot angles.

From considerations of theory, the range of the phase-sequence angles of any practical collection of transformer-core slots, represented, in Figs. 2, 3 and 7, by the 160 degrees of the collection of nine transformer-core slots 1 to 9 or 10 to 18, will be regarded as embracing substantially the theoretical range zero to $\pi$ or 180 degrees; and the range of the phase-sequence angles of any practical two-collection assembly of transformer-core slots, represented by the 340 degrees of the two-collection assembly of eighteen transformer-core slots 1 to 18, will similarly be regarded as embracing substantially the theoretical range zero to $2\pi$ or 360 degrees.

In Fig. 3, the conductor groups of the phase 1 distributed secondary winding disposed in the central transformer-core slots 5 and 14 are shown each provided with the maximum relative number of conductors, represented as 1.000 or unity. They are indicated in Fig. 3 as provided with five conductors. A similar showing appears in the central transformer-core slot 5 of Figs. 2 and 7. The conductor groups of the phase 1 distributed secondary phase winding disposed in the transformer-core slots 4, 6, 13 and 15 are similarly shown in Fig. 3 each provided with four conductors, to represent approximately the relative number 0.940. Though the ratio 5 to 4 is somewhat less than the ratio 1.000 to 0.940, the approximate diagrammatic showing of five conductors to represent the 1.000 conductor group and of four conductors to represent the 0.940 conductor group serves well enough for illustrative purposes.

The conductor groups of the phase 1 distributed secondary phase winding disposed in the transformer-core slots 3, 7, 12 and 16 are similarly shown in Fig. 3 as provided with three conductors to represent approximately the value 0.766, the conductors groups of the phase 1 distributed secondary phase winding disposed in the transformer-core slots 2, 8, 11 and 17 with two conductors to represent approximately the value 0.500, and the conductor groups of the phase 1 distributed secondary phase winding disposed in the transformer-core slots 1, 9, 10 and 18 with one conductor to represent approximately the value 0.174. The ratios 3:2:1 are sufficiently near the ratios 0.766:0.500:0.174 to serve well enough for illustrative purposes.

To provide substantially equal phase displacement of the three distributed phase windings of Fig. 3, the total angular ranges corresponding to the phase 2 and phase 3 distributed phase windings are respectively displaced with respect to the total angular range corresponding to the phase 1 distributed phase winding substantially $2\pi/3$ or 120 degrees and $4\pi/3$ or 240 degrees in the direction of the phase sequence. In this case, and in all similar cases, the angular displacement with respect to one another of the total angular ranges corresponding to the respective phase windings is an angular amount substantially equal to the phase displacement of the respective phase windings of the polyphase winding.

Accordingly, to the 0 to $2\pi$ or 360 degree total angular range corresponding to the phase 1 distributed secondary phase winding, there corresponds, in Fig. 3, the total angular ranges (0–120) to ($2\pi$ or 360–120) degrees and (0–240) to ($2\pi$ or 360–240) degrees for the phase 2 and phase 3 distributed secondary windings, respectively.

The conductor groups of the phase 2 and phase 3 distributed secondary phase windings of Fig. 3, similarly distributed over their respective total angular ranges, are duplicates of the conductor groups of the phase 1 distributed phase windings, but respectively displaced counterclockwise $2\pi/3$ or 120 and $4\pi/3$ or 240 degrees, respectively. They are duplicates, however, only because the particular number 18 of magnetic circuits or transformer-core slots is divisible by three, the particular number of distributed phase windings.

In the two-phase single-collection assembly of Fig. 7, wherein the displacement of the total angular ranges is only $\pi/2$ or 90 degrees, because, in this case, the number 18 of transformer-core slots or magnetic circuits is not divisible by four, the conductor groups of the phase 2 distributed secondary phase winding are different, although arrived at in exactly the same manner. In Fig. 7, the decimal fractions 0.985, 0.866, 0.643, 0.342, 0.000, 0.342, 0.643, 0.866 and 0.985, respectively indicating the numbers of conductors of the conductor groups of the phase 2 distributed secondary phase winding disposed in the transformer-core slots 1 to 9, are respectively the absolute or positive numerical values of the sine of 280, 300, 320, 340, 360, 20, 40, 60 and 80 degrees, the geometric-sequence or phase-sequence angles associated with the respective transformer-core slots decreased by $\pi/2$ or 90 degrees, the displacement of the respective total angular ranges.

A conductor group of each phase winding is thus disposed in each transformer-core slot. In Fig. 7, the transformer-core slots 5 and 14, representing a limiting case, are shown unprovided with conductor groups corresponding to the phase 2 distributed secondary phase winding. This, however, is only an apparent, and not a real, exception to the rule. It would occur in all such cases where the angle corresponding to that conductor group is equal to zero or a multiple of $\pi$ or 180 degrees. As required by the sine law, such a conductor group would have zero conductors, and would be indicated as 0.000. With this explanation, and including this limiting case, it may be said that each distributed secondary phase winding has a number of conductor groups substantially equal to the number of transformer-core slots, that a conductor group of each distributed secondary phase winding is disposed substantially in each transformer-core slot and the magnetic circuit encircling such transformer-core slot, and that the number of conductors of the conductor groups of each distributed secondary phase winding varies substantially as the absolute or positive numerical values of the sine over a total range substantially equal to $\pi$ or 180 degrees multiplied by the number of collections of magnetic circuits or transformer-core slots at angular increments each substantially equal to the total range divided by the number of magnetic circuits or transformer-core slots.

To provide the required number of conductors of the conductor groups of the phase 1 distributed winding, an endless coil or winding is wound through each of the transformer-core slots 1 to 18 of the full-line transformer core 547 of Figs. 2, 3 and 7. A 0.174 coil or winding is shown wound through each of the transformer-core slots 1, 9, 10 and 18, a 0.500 coil or winding through each of the transformer-core slots 2, 8, 11 and 17, a 0.766 coil or winding through each of the transformer-core slots 3, 7, 12 and 16, a 0.940 coil or winding through each of the transformer-core slots 4, 6, 13 and 15, and a 1.000 coil or winding through each of the transformer-core slots 5 and 14. Each of these coils or windings provides a number of conductors to the transformer-core slot in which it is disposed equal to the number of turns of that coil or winding.

That, however, constituted only one expedient for arriving at the desired result. A further example, as another illustration, is afforded by Fig. 11. In this Fig. 11, the relative number of turns per coil of the phase 1 sinusoidally distributed phase winding is represented by the 0.174, 0.326, 0.440, 0.500, 0.500, 0.440, 0.326 and 0.174 windings. A 0.174 winding is shown disposed in the transformer-core slots 1 and 2, so as to enclose the radial transformer-core section 42; a 0.326 winding in the transformer-core slots 2 and 3, so as to enclose the radial transformer-core section 43; a 0.440 winding in the transformer-core slots 3 and 4, so as to enclose the radial transformer-core section 44; and a 0.500 winding in the transformer-core 4 and 5, so as to enclose the radial transformer-core section 45. A 0.174 winding is disposed also in the transformer-core slots 8 and 9, so as to enclose the radial transformer-core section 49; a 0.326 winding in the transformer-core slots 7 and 8, so as to enclose the radial transformer-core section 48; a 0.440 winding in the transformer-core slots 6 and 7, so as to enclose the radial transformer-core section 47; and a 0.500 winding in the transformer-core slots 5 and 6, so as to enclose the radial transformer-core section 46.

The relative number of conductors in the transformer-core slots 1 and 9, therefore, is 0.174; the relative number of conductors in the transformer-core slots 2 and 8 is 0.174+0.326, or 0.500; the relative number of conductors in the transformer-core slots 3 and 7 is 0.326+0.440, or 0.766; the relative number of conductors in the transformer-core slots 4 and 6 is 0.440+0.500, or 0.940; and the relative number of conductors in the transformer-core slot 5 is 0.500+0.500, or 1.000.

The same relative number of conductors per slot, 0.174, 0.500, 0.766, 0.940 and 1.000, is thus arrived at with the employment of the relative number of turns per winding or coil shown in Fig. 11 that was obtained with the relative number of turns per winding or coil illustrated in Figs. 2, 3 and 7, merely by a different disposition of the coils or windings in the various transformer-core slots.

In the arrangement of Fig. 11, as in that of Figs. 2, 3 and 7, moreover, the coils or windings are shown endless or continuous. It will be obvious, however, that the desired relative number of conductors per slot may be arrived at by other types of windings also. The above examples do not, of course, exhaust the methods of distributing the conductor groups in the various transformer-core slots.

In the arrangements of Figs. 2, 7 and 11, the number of collections is one and, in the arrangement of Fig. 3, the number of collections is two. To represent the general case, there is illustrated in Fig. 6, by means of a block diagram, a three-collection assembly provided with 27 concentrated primary windings 1d to 27d and three distributed secondary phase windings corresponding to phase 1, phase 2 and phase 3. The angular increment in each of these figures is equal to the total angular range, π or 180 degrees multiplied by the number of collections, in this case three, divided by the number of magnetic circuits or transformer-core slots in each assembly, namely 27, or 20 degrees. The angular increment will, of course, vary depending upon the number of transformer-core slots or magnetic circuits in each collection. The sequence of these angular increments is the same as the phase sequence.

The direction of winding of the conductors of the conductor groups of each distributed phase winding changes alternately with, and with the negative of, the sign of the alternating function that determines the numbers of conductors of the respective conductor groups. For uniformity, and in accordance with this method of winding, the direction of winding is shown herein changing with the sign of the sine in the odd-numbered transformer-core slots and with the negative of the sine in the even-numbered transformer-core slots.

The conductor groups of each distributed phase winding are connected in series along the above-described directions of winding into the respective phase-winding circuits. Although the conductor groups of each distributed phase winding may be connected in series in any desired sequence, for uniformity and simplicity, they are shown herein connected into the respective phase-winding circuits in the order of their geometric or phase sequence. The directions of winding will be readily understood following a discussion of the respective phase-winding circuits.

The series circuit of the phase 1 distributed secondary phase winding is shown in Figs. 2, 3 and 7 extending from a line conductor 350, through the 0.174 coil or winding disposed in the transformer-core slot 1, and, by way of a conductor 351, to one end of the 0.500 coil or winding disposed in the transformer-core slot 2. The series distributed-phase-winding circuit continues through this 0.500 coil or winding, by way of a conductor 352, through the 0.766 coil or winding disposed in the transformer-core slot 3, by way of a conductor 353, through the 0.940 coil or winding disposed in the transformer-core slot 4, and, by way of a conductor 354, through the 1.000 coil or winding disposed in the central transformer-core slot 5. From this 1.000 coil or winding, the series distributed-phase-winding circuit continues, by way of a conductor 355, through the 0.940 coil or winding disposed in the transformer-core slot 6, by way of a conductor 356, through the 0.766 coil or winding disposed in the transformer-core slot 7, by way of a conductor 357, through the 0.500 coil or winding disposed in the transformer-core slot 8, and, by way of a conductor 358, through the 0.174 coil or winding disposed in the transformer-core slot 9, to another line conductor 359.

This completes the circuit of the series phase 1 distributed secondary phase winding disposed in the transformer-core slots of the positive collection of transformer-core slots 1 to 9. The connections of the coils or windings are such that the direction of winding of the conductor groups disposed in the odd-numbered transformer-core slots is in an assumed positive direction, downward, away from the reader, and the direction of winding of the conductor groups disposed in the even-numbered transformer-core slots is in the opposite or negative direction, upward, toward the reader.

In the arrangement of Fig. 3, the conductor 359 is shown connecting together the 0.174 coils or windings disposed in the transformer-core slots 9 and 10, but with a reversal in the direction of connection. From here on, the connections constitute a repetition of the connections already described. The series phase 1 distributed-phase-winding circuit continues through the 0.174 coil or winding disposed in the transformer-core slot 10, by way of a conductor 360, through the 0.500 coil or winding disposed in the transformer-core slot 11, by way of a conductor 361, through the 0.766 coil or winding disposed in the transformer-core slot 12, by way of a conductor 362, through the 0.940 coil or winding disposed in the transformer-core slot 13, by way of a conductor 363, through the 1.000 coil or winding disposed in the central transformer-core slot 14, by way of a conductor 364, through the 0.940 coil or winding disposed in the transformer-core slot 15, by way of a conductor 365, through the 0.766 coil or winding disposed in the transformer-core slot 16, by way of a conductor 366, through the 0.500 coil or winding disposed in the transformer-core slot 17, and, by way of a conductor 367, through the 0.174 coil or winding disposed in the transformer-core slot 18, to a line conductor 368. These connections of the coils or windings are such that the direction of winding is again reversed alternately, from transformer-core slot to transformer-core slot, but, this time, in such manner that the direction of winding in the even-numbered transformer-core slots is positive, and that in the odd-numbered transformer-core slots is negative.

The 0.174 coil or winding disposed in the transformer-core slot 10 is so connected into the series phase-winding circuit, by the conductor 359, that the direction of winding in the transformer-core slot 10 is in the same positive direction as the direction of winding of the 0.174 coil or winding disposed in the transformer-core slot 9. The directions of winding in the end slots 9 and 10 of the respective positive and negative collections are therefore in the same direction, and not in opposite directions.

The connecting conductors by means of which the coils or windings of the phase 2 and phase 3 distributed secondary windings of Fig. 3 are series-connected into their respective phase-winding circuits are shown numbered with the same reference numerals as for phase 1, but augmented by 100 for phase 2 and by 200 for phase 3.

In the single-collection assembly of Fig. 2, the phase 2 distributed secondary phase winding is illustrated as constituted of that half of the phase-winding circuit that is connected between the conductors 462 and 453 which, in Fig. 2, may therefore be referred to as line conductors. The two numerals 450 and 468 are applied to the same single conductor connecting the conductor groups disposed in the transformer-core slots 6 and 7, to conform with the showing of Fig. 3, in which this same single conductor is broken to provide the line conductors 450 and 468 for the phase 2 distributed secondary phase winding.

The series circuits of the conductor groups of the various distributed windings comprise complete phase windings which may be connected either in delta or Y. The delta and Y connections for the assembly shown in Fig. 2 are respectively illustrated diagrammatically in Figs. 12 and 13.

In the single-collection assembly of Fig. 7, the conductor groups of the phase 2 distributed secondary phase winding, previously described as different from the conductor groups of the phase 1 distributed secondary phase winding, may be connected into a somewhat similar phase winding. This phase winding, corresponding to phase 2, may be traced, with a negative direction of winding, from the line conductor 370, through the 0.985 conductor group disposed in the transformer-core slot 1, with a positive direction of winding, by way of a conductor 371, through the 0.866 conductor group disposed in the transformer-core slot 2, with a negative direction of winding, by way of a conductor 372, through the 0.643 conductor group disposed in the transformer-core slot 3, and, with a positive direction of winding, by way of a conductor 373, through the 0.342 conductor group disposed in the transformer-core slot 4. Then, with a negative direction of winding, this series phase-winding circuit continues, by way of the conductor 374, through the 0.342 conductor group disposed in the transformer-core slot 6, with a positive direction of winding, by way of the conductor 375, through the 0.643 conductor group disposed in the transformer-core slot 7, with a negative direction of winding, by way of the conductor 376, through the 0.866 conductor group disposed in the transformer-core slot 8, and, finally, with a positive direction of winding, by way of a conductor 377, through the 0.985 conductor group disposed in the transformer-core slot 9, to a conductor 378. The conductors 359 and 378 of the respective phase 1 and phase 2 distributed secondary phase windings are shown in Fig. 7 connected to a common line conductor 379.

The connections of this circuit also provide alternately opposite directions of winding from transformer-core slot to transformer-core slot, with a reversal of connections, where the sine changes sign, through the medium of the conductor 374.

The series circuit of the phase 1 distributed secondary phase winding diagrammatically illustrated in Fig. 11 may similarly be traced by way of the line conductor 651, through the 0.174 winding disposed in the transformer-core slots 1 and 2, by way of a conductor 652, through the 0.326 winding disposed in the transformer-core slots 2 and 3, by way of a conductor 653, through the 0.440 winding disposed in the transformer-core slots 3 and 4, by way of a conductor 654, through the 0.500 winding disposed in the transformer-core slots 4 and 5, by way of a conductor 655, through the 0.500 winding disposed in the transformer-core slots 5 and 6, by way of a conductor 656, through the 0.440 winding disposed in the transformer-core slots 6 and 7, by way of a conductor 657, through the 0.326 winding disposed in the transformer-core slots 7 and 8, and, by way of a conductor 658, through the 0.174 winding disposed in the transformer-core slots 8 and 9, to the line conductor 659.

In the single-collection assembly of Fig. 11, the conductor groups of the phase 2 and phase 3 distributed secondary phase windings are shown connected into respective series phase-winding circuits identical to the series phase-winding circuit of the phase 1 distributed secondary winding. To illustrate this similarity, the connecting conductors by means of which the coils or windings of the phase 2 and phase 3 distributed secondary windings of Fig. 11 are series-connected into their respective phase-winding circuits are shown numbered with the same reference numerals as for phase 1, but augmented by 10 for phase 2 and by 20 for phase 3.

It is possible thus to have like distributed phase windings in a single-collection transformer system of the present invention when the transformer core embodies an odd number of transformer-core slots and the number of distributed secondary phase windings is a factor of the number of transformer-core slots. Under such conditions, the conductor groups associated with angular values differing by $\pi$ or 180 degrees, in addition to having the same number of conductors, because of the alternately opposite polarity from transformer-core slot to transformer-core slot, also have the same direction of winding. However, in Fig. 11, the center lines of the phase 2 and phase 3 windings are indicated as negative, because these center lines are associated with an angular value of $3\pi/2$ or 270, rather than $\pi/2$ or 90 degrees.

The connections of the series phase-winding circuits of Fig. 11, like the connections of the series phase-winding circuits of Figs. 2, 3 and 7, provide alternately opposite directions of winding from transformer-core slot to transformer-core slot, with a reversal of connections where the sine changes sign.

For analytical purposes, it will be first assumed that, in each transformer-core slot, there is disposed a conductor group of the same number of turns or conductors, and that these conductor groups, like the individual concentrated primary windings $1d$ to $18d$ of Figs. 2, 3 and 7, are wound in alternately opposite directions through the transformer-core slots 1 to 18. This number of turns or conductors will hereinafter be referred to as the unit number of turns or conductors, and the conductor group embodying such unit number of turns or conductors will be referred to as the unit conductor group.

The equal alternating voltages induced in the unit conductor groups disposed in the various transformer-core slots may be termed unit voltages, and their peak amplitudes may also be taken as unity. Assuming a sinusoidal wave form, the unit voltages induced in unit conductor groups respectively disposed in the transformer-core slots 1 to 9 of Figs. 2, 7 and 11 may be represented by the curves $e_1$ to $e_9$ of Fig. 8. To avoid the confusion that would be introduced by nine additional curves, the voltages induced in unit conductor groups respectively disposed in the transformer-core slots 10 to 18 of Fig. 3 may be represented by means of the respective vectors $e_{10}$ to $e_{18}$ of Fig. 8. Each of these vectors, positioned on the axis of abscissae at the point at which occurs the corresponding peak unit or 1.000 value, represents a sinusoidal variation of exactly the same type as do the curves $e_1$ to $e_9$.

In each distributed-phase-winding conductor group, a voltage will be induced proportional to the number of conductors or turns in the conductor group. Each such induced voltage, for reasons which will become apparent, will be referred to as a component voltage.

Referring to Fig. 14, the component voltage induced in the conductor group disposed in the transformer-core slot 1, represented by the sinusoid $E_1$, is equal to the corresponding unit voltage $e_1$ multiplied by the sine of the 10 degree phase-sequence angle associated with the transformer-core slot 1, or $$E_1 = e_1 \sin 10°$$

The component voltage induced in the conductor group disposed in the transformer-core slot 2, represented by the sinusoid $E_2$, is similarly equal to the corresponding unit voltage $e_2$ multiplied by the sine of the 30 degree phase-sequence angle associated with the transformer-core slot 2, or $$E_2 = e_2 \sin 30°$$

and so on.

Since the number of conductors of the conductor groups of the transformer-core slots varies as the sine of the corresponding phase-sequence angle, the peak amplitudes are each respectively shown in Fig. 14 as equal to the peak amplitude of the alternating unit voltage induced in the said unit number of conductors multiplied by the sine of the corresponding phase-sequence angle.

The component voltages induced in the negative collection of transformer-core slots 10 to 18 are duplicates of those induced in the positive collection of transformer-core slots 1 to 9, and will be represented by sinusoidal curves that are duplicates of, and superposed upon, the respective sine curves $E_1$ to $E_9$.

The component voltages induced in the conductor groups disposed in the transformer-core slots of the single collection of transformer-core slots 1 to 9, represented by the curves $E_1$ to $E_9$, respectively, will add, in the series distributed-secondary-phase-winding circuit described, to produce the resultant voltage represented by the curve $E_R$ of Fig. 14. This voltage addition may be expressed by the equation $$R_R = E_1 \pm E_2 + E_3 + E_4 + E_5 + E_6 + E_7 + E_8 + E_9 \quad (1)$$

By substitution, this resultant voltage may be expressed, in terms of the original unit voltages, as $$E_R = e_1 \sin 10° + e_2 \sin 30° + e_3 \sin 50° \ldots + e_9 \sin 170° \quad (2)$$

The analytical treatment will now be taken up in connection with the more general problem of a transformer system having a two-collection assembly of $n$ transformer-core slots and, therefore, with the $n$ conductor groups of the phase 1 secondary phase winding respectively disposed therein, and also with the alternating component voltages induced in those conductor groups, respectively represented by sinusoids of the nature illustrated by Fig. 14. It will therefore be assumed, in Fig. 15, that the range $$x = 2\pi$$

on the X axis of abscissae, has been divided up into $n$ equal intervals. It will be assumed also that the ordinates of the component sinusoidal curves of Fig. 15 are each zero, changing from negative to positive, at $$x = m$$

where $m$ is any integer from 1 to the total number $n$.

Let the sine curve representing both the unit voltage $e_5$ and the component voltage $E_5$ of Fig. 15 be represented by the equation $$y = \sin x$$

Then the equation of the $m$th sine curve, representing the alternating component voltage induced in the conductor group disposed in the $m$th transformer-core slot, is $$y = \cos \frac{2\pi}{n} m \sin \left( x - \frac{2\pi}{n} m \right)$$

The equation of the resultant composite curve representing the addition of all these component sine curves is therefore equal to the sum of the individual equations of these component sine curves and this reduces to $$E_R = \frac{n}{2} \sin x \quad (3)$$

In the phase 1 distributed secondary phase winding comprising two collections of conductor groups illustrated in Fig. 3, therefore, the alternating component voltages induced in the various conductor groups will add their contributions to produce a sinusoidal resultant composite voltage $E_R$ of the same frequency and phase as either the alternating unit voltage or the component voltage induced in the central transformer-core slot 5. The peak amplitude of this sinusoidal resultant composite voltage $E_R$ is equal to the peak amplitude of either the unit voltage or the component voltage induced in the central transformer-core slot 5 multiplied by one-half the total number of transformer-core slots in the two-collection assembly. In Fig. 3, this total number is 18, and one-half that number is 9.

When the total number of transformer-core slots in a two-collection assembly is even, the two collections of conductor groups are necessarily duplicates and equal contributions are therefore afforded from both collections. The resultant or composite voltage induced in a distributed secondary phase winding comprising only a single collection of conductor groups, as illustrated in Figs. 2, 7 and 11, may therefore be expressed by the equation $$E_R = \frac{n}{4} \sin x$$

or by the equation $$E_R = \frac{N}{2} \sin x \quad (4)$$

where N is the number of component voltages induced in the conductor groups of a single-collection-assembly transformer arrangement.

It may be shown that the equation thus derived for the composite sinusoidal voltage $E_R$ induced in the phase 1 distributed phase winding of Figs. 2, 3, 7 and 11, is applicable also to arrangements wherein no transformer-core slots are alined with the reference center lines $$\mathcal{C}$$

or reference zero lines Z.L. and to sinusoidally distributed phase windings which are in different orientation with respect to the transformer-core slots.

In certain practical applications of the present invention, the voltages impressed upon the primary phase windings $1d$ to $18d$ of Figs. 2, 3 and 7 are of the same wave form and the same peak amplitude, but they are not sinusoidal. In such applications, the component voltages induced in the conductor groups of the distributed secondary phase windings are of the same non-sinusoidal wave form. The peak amplitudes of these non-sinusoidal component voltages, like the peak amplitudes of the sinusoidal component voltages heretofore described, are proportional to the numbers of conductors of the conductor groups in which they are respectively induced. Despite their non-sinusoidal wave form, however, if the numbers of conductors of each distributed secondary phase winding changes as the sine, and the direction of winding varies alternately with, and with the negative of, the sign thereof, the resultant composite voltage will still be very nearly sinusoidal. This arises from the fact that most of the harmonics present in the component voltages are suppressed in the sinusoidally distributed secondary phase windings and therefore do not appear in the composite output voltages. Just what harmonics are suppressed depends upon the number of component voltages, magnetic circuits or transformer-core slots.

It will be demonstrated, by summing separately the respective harmonics of the non-sinusoidal component voltages, that most of the harmonics of these non-sinusoidal component voltages cancel in the sinusoidally distributed secondary phase winding and that, for this reason, the composite voltage curve is substantially sinusoidal. This will be done analytically for the general case of a transformer system of the present invention provided with a two-collection assembly of $n$ transformer-core slots.

The curves $E_1$ to $E_9$ of Fig. 14, previously described as representing the component voltages respectively induced in the conductor groups of the phase 1 distributed secondary phase winding disposed in the transformer-core slots 1 to 9, when these component voltages are assumed sinusoidal, may now therefore be regarded as representing also the fundamental voltages of the component voltages when the component voltages are assumed non-sinusoidal.

Because the non-sinusoidal component voltages induced in the transformer-core slots are of the same wave form, they are all known to contain fundamental and harmonic voltages respectively of the same frequency and in exactly the same ratio. It is therefore possible to represent any harmonic voltage of any amplitude H, of any harmonic order $h$, in any desired phase relation $\beta$, induced in the conductor group of the phase 1 distributed phase winding disposed in the $m$th transformer-core slot by the equation $$y = H \cos\left(\theta + \frac{2\pi}{n}m\right) \sin h.\left(x - \theta - \beta - \frac{2\pi}{n}m\right)$$

This equation introduces an angle $\theta$ to represent the general case in which the transformer-core slots are displaced by that angle from the position shown in the drawings. In that position, of course, $\theta = 0$.

The sum of the harmonic voltages of the harmonic order $h$ induced in the conductor groups of the phase 1 distributed secondary phase winding comprising two collections of conductor groups accordingly becomes represented by the equation $$Y = H \Sigma \cos\left(\theta + \frac{2\pi}{n}m\right) \sin h.\left(x - \theta - \beta - \frac{2\pi}{n}m\right)$$

It may be shown that this equation equals zero, except when $h \pm l$ is any whole number $k$ multiplied by $n$, the number of transformer-core slots in the two-collection assembly of transformer-core slots, or $$h = kn \pm l$$

In either of these two latter cases, the equation reduces to $$Y = \frac{n}{2} H \sin\left[h.(x - \theta - \beta) \pm \theta\right] \quad (5)$$

All other harmonics of the non-sinusoidal component voltages cancel in the sinusoidally distributed secondary phase winding.

The transformer system shown in Fig. 2, as previously explained, performs in exactly the same manner as each of the two like collections of the two-collection assembly of Fig. 3, and the same harmonics are therefore cancelled. Similar considerations apply to the cancellation of the harmonics in the sinusoidally distributed phase 2 and phase 3 windings of Figs. 2 and 3, and the phase 1 and phase 2 sinusoidally distributed phase windings of Fig. 7.

It is well-known that the third harmonic and the odd multiples of the third harmonic can be readily cancelled in a three-phase electric system. An important feature of the present invention, however, resides in providing a transformer system in which further selected harmonics may be cancelled. To accomplish this, the transformer system of Figs. 2, 3 and 7 may be provided with four or more transformer-core slots in each collection of transformer-core slots, and respective individual or concentrated windings disposed therein. Since corresponding individual or concentrated windings of the various collections may be excited from the same primary phase, for applications requiring the cancellation of harmonics, the transformer system of Figs. 2, 3 and 7 may be provided with four or more individual or concentrated phase windings.

When the number $n$ of transformer-core slots is equal to eight, not shown, the harmonics $h$ which do not cancel in the secondary windings are $$h = 8k \pm l$$

or the 7th, 9th, 15th, 17th, 23rd and so on. Thus with only four transformer-core slots in each collection of transformer-core slots, not only the 5th, but also the 11th, 13th, 19th, and other higher harmonics are cancelled. As the number $n$ of transformer-core slots is increased, the number of cancelled harmonics is also increased. In the transformer system of Figs. 2, 3 and 7, wherein the number $n$ of transformer-core slots is eighteen, for example, only the 17th, 19th, 35th, 37th and similarly spaced other higher harmonics remain uncancelled.

A very pure composite sinusoid is therefore obtainable, even when the alternating component voltages are not truly sinusoidal. Whatever deviation from the theoretical sine wave appears, in actual practice, at the output terminals of the transformer system of the present invention, is confined to the higher harmonics, and to only a very few of those.

It is now in order to consider the operation of the transformer system of the present invention under load conditions. The analysis above, based merely upon the alternating magnetomotive forces produced in the magnetic circuits of the magnetic system by the alternating current from the polyphase supply system in the primary windings $1d$ to $8d$ must be supplemented by the additional alternating magnetization effected in these magnetic circuits by the secondary alternating currents in the conductor groups connected into the various phase-winding circuits.

The currents of the distributed secondary phase windings each supplies a component magnetomotive force of the corresponding phase to each transformer-core slot that is proportional to the number of conductors of the conductor group of that distributed secondary phase winding disposed in that particular transformer-core slot. The maximum magnetomotive force is accordingly contributed to the transformer-core slot provided with a conductor group of that distributed phase winding comprising the maximum or unit number of conductors. This maximum magnetomotive force may be referred to as a unit magnetomotive force and its relative peak amplitude may be assumed equal to unity or 1.000, numerically the same as the number of conductors of the conductor group. The relative peak amplitude of the magnetomotive force contributed to any other transformer-core slot by the current of this same phase is then similarly numerically the same as the number of conductors of the conductor group of this distributed secondary phase winding disposed in that transformer-core slot.

Referring to Fig. 16, with suitable choice of the origin of coordinates, the unit magnetomotive force contributed to any transformer-core slot by the current of phase 1 in an assumed unit conductor group of that phase disposed in that transformer-core slot may be represented, disregarding the alternately opposite polarity, by the equation $$y = \sin x$$

The corresponding equation for the unit magnetomotive force contributed to any transformer-core slot by the current of the $q$th phase in an assumed unit conductor group of that $q$th phase disposed in that transformer-core slot, disregarding the alternately opposite polarity, is then $$y = \sin\left(x - \frac{2\pi}{p}q\right) \quad (6)$$

The relative number of conductors in the conductor group disposed in the central transformer-core slot of this distributed secondary phase winding corresponding to the $q$th phase, however, is $$\sin\left(\frac{\pi}{2}-\frac{2\pi}{p}q\right)=\cos\frac{2\pi}{p}q$$

The magnetomotive force exerted in the central transformer-core slot by the current of the $q$th phase is therefore $$y=\cos\frac{2\pi}{p}q\,\sin\left(x-\frac{2\pi}{p}q\right)$$

The total magnetomotive force contributed by the currents of all $p$ phases to the central transformer-core slot is accordingly $$y=\Sigma\,\cos\frac{2\pi}{p}q\,\sin\left(x-\frac{2\pi}{p}q\right)$$

where the addition is taken throughout the complete range of $2\pi$ or 360 electric degrees corresponding to the total range of phase displacement of the $p$ phases. This equation reduces to $$y=\frac{p}{2}\sin x \qquad (7)$$

The total magnetomotive force contributed by the currents of all $p$ phases in the central transformer-core slot is therefore sinusoidal, of the same phase and frequency as the current of phase 1, and with a peak amplitude proportional to half the sum of the $p$ phases.

The problem will now be solved for any other transformer-core T, the angle of which is S degrees removed from the positive reference zero line +Z. L., as illustrated in Fig. 16. It has already been stated that, disregarding the alternately opposite polarity, the unit magnetomotive force of the current of the $q$th phase in any transformer-core slot may be expressed by the equation $$y=\sin\left(x-\frac{2\pi}{p}q\right)$$

The number of conductors of the conductor group of the $q$th distributed secondary phase winding disposed in the T transformer-core slot is $$\sin\left(S-\frac{2\pi}{p}q\right)$$

The magnetomotive force of the current of the $q$th phase in the transformer-core slot T is therefore represented by $$y=\sin\left(S-\frac{2\pi}{p}q\right)\sin\left(x-\frac{2\pi}{p}q\right)$$

and the total magnetomotive force contributed in the transformer-core slot T by the currents of all $p$ phases is $$y=\Sigma\,\sin\left(S-\frac{2\pi}{p}q\right)\sin\left(x-\frac{2\pi}{p}q\right)$$

where the summation is again to be taken over the whole $2\pi$ or 360 degrees corresponding to the total range of phase displacement of the $p$ phases. This equation reduces to $$y=\frac{p}{2}\cos(S-x) \qquad (8)$$

This equation, representing the magnetomotive force contributed to the transformer-core slot T by the currents in the conductor groups of all the sinusoidally distributed phase windings corresponding to all $p$ phases, therefore, represents precisely the same sinusoid described above by Equation 7, representing the magnetomotive force contributed by the currents in the conductor groups of all $p$ sinusoidally distributed phase windings in the central transformer-core slot 5, but displaced $$S=\frac{\pi}{2}$$

degrees in phase, where S is the slot angle of the transformer-core slot T, measured with respect to the positive reference zero line +Z. L.

The total magnetomotive forces contributed in the respective transformer-core slots by the currents in the conductor groups of all $p$ sinusoidally distributed phase windings, therefore, are all sinusoidal, and, disregarding the alternately opposite polarity, equally phase-displaced. The peak amplitudes of these sinusoidal magnetomotive forces are proportional to half the number $p$ of distributed phase windings.

In the polyphase transformer system of the present invention, accordingly, a substantially sinusoidal component magnetomotive force is supplied to each transformer-core slot by the substantially sinusoidal alternating current of each sinusoidally distributed phase winding. The amplitude and the polarity of each of these component magnetomotive forces are determined respectively by the number of conductors of the conductor group in which it is produced and the direction of winding of these conductors. Due to the displacement of the total angular ranges by means of which the relative numbers of conductors of the conductor groups of the respective phase windings are determined, the combined or total magnetomotive forces contributed to the various transformer-core slots are equally phase-displaced over the same total range of phase displacement as the primary currents and the alternating magnetomotive forces produced thereby. Unlike the primary magnetomotive forces, however, the secondary total magnetomotive forces are substantially sinusoidal.

The magnetomotive-force contributions of the primary and secondary polyphase currents have the same phase displacement in each magnetic circuit, and the contributions from each of these two sources have the same peak amplitude and wave form in each of the magnetic circuits. The resultant magnetic fluxes of the magnetic circuits encircling the transformer-core slots 1 to 18 are therefore of the same peak amplitude and wave form and they are equally phase-displaced over the characteristic total range of phase displacement of 180 magnetic degrees corresponding to each collection. This, as previously described, was the condition necessary to produce substantially sinusoidal equally phase-displaced composite induced voltages.

The absolute phase relation of the magnetomotive forces of the polyphase current is determined by the power factor of the load. However, the resultant magnetic fluxes remain of like wave form, and the induced composite voltages remain substantially sinusoidal, irrespective of changes resulting from changes in the load and changes introduced by variations in the power factor of the load.

For transformations between sinusoidal polyphase electric systems, the transformer system of the present invention becomes greatly simplified. The theory relating to the phase windings is the same as previously explained but, since present-day sinusoidal polyphase electric systems are provided with few phases, usually either two or three, the number of primary and secondary phase windings and the number of transformer-core slots and magnetic circuits is correspondingly small.

In Fig. 17, there is illustrated a unitary core 708 very similar to the unitary core 547 of Fig. 3, but provided with a two-collection assembly of only six transformer-core slots 701 to 706 and with six corresponding magnetic circuits, one encircling each transformer-core slot. These magnetic circuits are excited in alternately opposite polarity to provide, disregarding the alternately opposite polarity, equal phase displacement of the magnetic circuits over the range $2\pi$ or 360 magnetic degrees, in increments of 60 magnetic degrees.

The radial transformer-core sections, teeth or legs 711 to 716 are shown, in Fig. 17, separated by the transformer-core slots 701 to 706. Individual like or identical coils or windings are wound, all in the same direction, around the respective radial transformer-core sections, teeth or legs, adjacent to the peripheral section 88 of the core 708, through the two adjacently disposed transformer-core slots. Assuming, for the present, that these like or identical coils or windings are the primary windings, by using an alternately opposite direction of connection, they may be connected to, and energized from, a six-phase symmetrical electric system (not shown). In Fig. 17, however, they are shown corresponding to the phases 1 to 3 of a three-phase electric system to which they may be respectively connected. When connected to the phases 1 to 3, in the order indicated, the phase displacement of the resultant currents supplied to the transformer-core slots, and the phase displacement of the alternating magnetic fluxes produced thereby, is the same as when the windings are energized from the above-mentioned six-phase symmetrical electric system (not shown). With this method of excitation, therefore, the resultant currents supplied to the transformer-core slots 701 to 706, and the alternating magnetic fluxes produced in the magnetic circuits respectively encircling the transformer-core slots, are equally phase-displaced around the circumference by increments of 240 electric or magnetic degrees, or disregarding the alternately opposite polarity, by increments of 60 electric or magnetic degrees.

The transformer core 708 is also provided with secondary windings corresponding to the phases of a two-phase unsymmetrical electric system. These secondary windings, indicated in Fig. 17 as phase 1b and phase 2b, comprise two-collection assemblies of conductor groups the conductors of which are sinusoidally distributed in the manner previously described.

The positive reference zero line +Z.L. is shown in Fig. 17 alined with the transformer-core slot 701. The geometric-sequence or phase-sequence angles associated with the transformer-core slots 701 to 706 are therefore respectively equal to 0, 60, 120, 180, 240 and 300 degrees. The relative numbers of conductors of the conductor groups of the secondary phase winding corresponding to the phase 1b of the two-phase electric system, disposed in the transformer-core slots 701 to 706, are therefore shown equal to 0.000, 0.866, 0.866, 0.000, 0.866 and 0.866, respectively. The 0.866 relative number of conductors disposed in each of the transformer-core slots 702 and 703 is obtained from a single 0.866 coil wound in these transformer-core slots around the radial transformer-core section or leg 712. Similarly, the 0.866 relative number of conductors disposed in each of the transformer-core slots 705 and 706 is obtained from a single 0.866 coil wound through these transformer-core slots around the radial transformer-core section or leg 715. The relative number of conductors of the conductor groups disposed in the transformer-core slots 701 and 704 is equal to 0.000, the sine of 0 and $\pi$ or 180 degrees, respectively, and no actual physical coil, corresponding to phase 1b of the two-phase electric system, is therefore shown disposed in these two transformer-core slots.

The series circuit of the distributed secondary phase winding corresponding to phase 1b of the two-phase electric system may be traced from a line conductor 721 through the 0.866 transformer-secondary-winding coil wound in a positive direction through the transformer-core slot 703 and in a negative direction through the transformer-core slot 702, and, by way of the conductor 722, through the 0.866 transformer-secondary-winding coil wound in the positive direction through the transformer-core slot 706 and the negative direction through the transformer-core slot 705, to the line conductor 723. The conductor 722 provides the change from the alternately opposite direction of winding, as required by the change in the sign of the sine function.

The angular range corresponding to phase 2b of the two-phase electric system is displaced $\pi/2$ or 90 degrees in the direction of the phase-sequence. The decimal fractions representing the numbers of conductors of the conductor groups of the distributed phase winding corresponding to this phase 2b disposed in the transformer-core slots 701 to 706 are therefore equal to 1.000, 0.500, 0.500, 1.000, 0.500 and 0.500, the absolute values of the sine of 270, 330, 30, 90, 150 and 210 degrees, the geometric-sequence or phase-sequence angles associated with the transformer-core slots 701 to 706 decreased by $\pi/2$ or 90 degrees, respectively. These relative numbers of conductors are obtained by means of four coils, each of 0.500 relative number of turns, respectively wound around the radial transformer-core sections or legs 711, 713, 714 and 716 of the transformer core 708.

The series distributed phase-winding circuit of this phase winding corresponding to phase 2b of the two-phase electric system may be traced from a line conductor 727b, through the 0.500 transformer-secondary-winding coil wound in the transformer-core slots 703 and 704 about the radial transformer-core section 713, by way of a conductor 728, through the 0.500 transformer-secondary-winding coil wound in the transformer-core slots 704 and 705 about the transformer-core section or leg 714, by way of a conductor 729, through the 0.500 transformer-secondary-winding coil wound in the transformer-core slots 706 and 701 about the transformer-core section or leg 716, and, by way of a conductor 726, through the 0.500 transformer-secondary-winding coil wound in the transformer-core slots 701 and 702 around the transformer-core section or leg 711, to a line conductor 727a. The relative number of conductors is therefore 1.000 for the transformer-core slots 701 and 704, and 0.500 for the transformer-core slots 702, 703, 705 and 706.

Fig. 18 represents one of the two identical half-portions of the arrangement of Fig. 17. This half-portion comprises the radial transformer-core sections, teeth or legs 711, 712 and 713 of the transformer core 708, each separating two adjacently disposed transformer-core slots of the transformer-core slots 701, 702 and 703. Three like or identical primary windings, corresponding to the phases 1 to 3 of the three-phase electric system, are wound around the transformer-core sections or legs 713, 712 and 711, respectively. Corresponding portions of the distributed secondary windings corresponding to the phases 1b and 2b of the two-phase electric system are also wound around the legs 711, 712 and 713. The portion of the distributed secondary winding corresponding to phase 1b of the two-phase electric system comprises the line conductor 721, the 0.866 coil wound around the radial transformer-core section or leg 712, and the conductor 722 which, in Fig. 18, is represented also as a line conductor. The portion of the distributed secondary winding corresponding to phase 2b of the two-phase electric system comprises the conductor 726, the 0.500 coil wound around the radial transformer-core section or leg 711, a single conductor 727, the 0.500 coil wound around the radial transformer-core section or leg 713, and a conductor 728. The 0.500 coils of the distributed secondary winding corresponding to phase 2b of the two-phase electric system are connected in series in such manner that the single conductor 727 replaces the conductors 727a and 727b of Fig. 17, and the conductors 726 and 728 are shown as line conductors.

The magnetic circuits encircling the transformer-core slots 701 to 703 of Fig. 18 are represented by means of the dashed lines 717 to 719, respectively.

The transformer system illustrated by Fig. 18, like that of Fig. 17, therefore, provides for a transformation between a three-phase system and a two-phase system.

The theory of operation, as explained in connection with the transformer systems illustrated in Figs. 2, 3, 7 and 11, is applicable also to the transformer systems of Figs. 17 and 18. Since the primary voltages are sinusoidal, however, there will not be any harmonics to cancel; though it will be observed that, if the primary voltages were non-sinusoidal, the third, ninth, and the other triple harmonics would cancel in the distributed secondary phase windings by reason of fact that the number of transformer-core slots in the two-collection assembly is six. In sinusoidal transformations, a more important property of the sinusoidally distributed polyphase winding is that the load upon the primary polyphase system remains balanced and the secondary voltages therefore remain equally phase-displaced and of equal amplitude.

As previously explained, the magnetizable core of the transformer system of the present invention may be altered in physical appearance with no changes in the theory of operation. Since the magnetizable core serves only as a medium through which the magnetic flux may encircle the particular windings or conductors, as long as it performs this function, its disposition and its form is of little consequence. Numerous variations in the core structure become apparent if the transformer core is considered plastic and malleable into any desired form. For practical applications, however, the form of the magnetizable core should be such that it can be laminated. As an example, a modification of the transformer system will now be considered in connection with Fig. 19, wherein a conventional rectangular-shaped three-phase transformer core replaces the circular transformer core 708 of Fig. 18.

The polyphase transformer system of Fig. 19 is electrically the full equivalent of that illustrated in Fig. 18. The geometry of the transformer core alone is changed, wherefore it is represented by the same reference numeral 708. In the arrangement of Fig. 19, as in the arrangement of Fig. 18, the transformer-core sections or legs 711, 712 and 713 are shown separated by the intermediately disposed transformer-core slots 702 and 703, and the ends of the transformer-core sections or legs 711, 712 and 713 are shown tied together.

For definiteness, the transformer-core sections or legs 711 and 713 of Figs. 18 and 19 will be hereinafter referred to as the outermost transformer-core sections or legs, and the transformer-core sections or legs 711 and 712, as well as the transformer-core sections or legs 712 and 713, as adjacently disposed transformer-core sections or legs.

In Fig. 18, the outer ends of the transformer-core sections or legs 711, 712 and 713 are shown joined together by the peripheral portion of the circular core 708, and their inner ends are joined together at the center of the core. In Fig. 19, the corresponding ends of the transformer-core sections or legs 711, 712 and 713 are shown respectively joined together at the long sides of the rectangular core 708. The magnetic circuits 717, 718 and 719, and the transformer-core slots 701, 702 and 703 which they respectively encircle, are of different geometric shape in Fig. 19. The transformer-core slot 701 of Fig. 19 is constituted of the space including the transformer-core slots 702 and 703, and the transformer-core section or leg 712, enveloped by the magnetic circuit 717. Since the transformer-core slot 701 has no physical existence separate and apart from the transformer-core slots 702 and 703, it may, for purposes of identification, be referred to as a theoretical transformer-core slot 701. The transformer-core slots 702 and 703 may similarly be referred to as actual transformer-core slots 702 and 703. There are no changes, however, in either the transformer primary or secondary windings disposed in the transformer-core slots, actual or theoretical, as between the representations of Figs. 18 and 19, and, of course, there are no changes in the corresponding magnetic circuits. Although the transformer primary winding corresponding to phase 2 of the three-phase electric system and the 0.866 transformer-secondary-winding coil wound around the transformer-core section 712 are both disposed within the magnetic circuit 717, they do not affect and they are not affected by, the alternating magnetic flux of this magnetic circuit 717, since they provide the same number of conductors in each direction through the transformer-core slot 701.

The arrangement of Fig. 19 is not, of course, the only arrangement in which a transformer-core slot may have only a theoretical existence, in the sense that physically it overlaps actual transformer-core slots. In such cases, the phase coils or windings of the corresponding sinusoidally distributed polyphase winding may be defined in terms of coils or windings wound around respective transformer-core sections or legs, rather than in terms of conductors of conductor groups wound through the transformer-core slots. The phase coils or windings of the sinusoidally distributed polyphase winding that, in Fig. 18, are shown disposed in the actual transformer-core slot 701, for example, may be described, in connection with the corresponding theoretical transformer-core slot of Fig. 19, as wound about the transformer-core sections or legs 711 and 713. This will be understood more fully in connection with the description given hereinafter of Figs. 1 and 9, which are related to each other in much the same manner as Figs. 19 and 18, respectively.

As previously explained, the number of conductors of a conductor group is equal to the sum of the numbers of turns of the coils or windings contributing to that conductor group. When only one coil or winding contributes to a particular conductor group, the said sum is, of course, equal to the number of turns of that coil or winding. The directions of winding of the coils contributing turns to the said sum must be the same through the particular transformer-core slot and, therefore, opposite around the adjacently disposed transformer-core sections or legs. A similar remark applies to the directions of winding of the coils encircling the outermost transformer-core sections or legs which contribute conductors to the non-existent theoretical transformer-core slot.

The primary and secondary phase windings may, of course, be provided in the transformer systems of Figs. 18 and 19 in other ways.

It is also possible, within the invention, to have transformer systems in which the sinusoidally distributed phase windings of the one polyphase winding respectively correspond to the phases of the non-sinusoidal, rather than the sinusoidal, polyphase electric system, and in which the individual or concentrated phase windings of the other polyphase winding respectively correspond to the phases of the sinusoidal, rather than the non-sinusoidal, polyphase electric system. The number of transformer-core slots and magnetic circuits of the transformer system is then equal to the number of phases of the sinusoidal polyphase electric system. In transformer systems of this nature, also, either polyphase winding may function as the primary winding, and the other polyphase winding will then function as the secondary winding.

With this further type of transformer system, the same transformations can be accomplished as with the transformer systems heretofore described. As a concrete example, there is shown in Figs. 1 and 9 a transformer system of this further type that performs the same transformation, between the nine-phase non-sinusoidal electric system and the three-phase substantially sinusoidal electric system, that is performed by the transformer system of Fig. 2.

In Fig. 1, the transformer system of the present invention is shown provided with the conventional rectangular-shaped three-phase transformer core 708 previously described in connection with Fig. 19, and, in Fig. 9, for purposes of associating geometric angles with phase angles, the same transformer system is shown provided with the equivalent circular transformer core previously described in connection with Fig. 18. As in the case of Figs. 18 and 19, reference will be made, in Figs. 1 and 9, to the outermost transformer-core sections or legs 711 and 713, and to the adjacently disposed transformer-core sections or legs 711 and 712 and 712 and 713.

In both Figs. 1 and 9, as in Figs. 18 and 19, the transformer system is shown provided with three like individual phase 1, phase 2 and phase 3 windings wound around the respective transformer-core sections or legs 713, 712 and 711.

The transformer system of Figs. 1 and 9 is shown provided with nine distributed phase windings 1g to 9g respectively corresponding to the nine phases of a nine-phase unsymmetrical electric system. Each of these distributed phase windings comprises three conductor groups, provided by two coils wound around respective transformer-core sections or legs, connected in series into respective phase-winding circuits.

To simplify the discussion of further features of the present invention, the single-collection assembly of Fig. 9 is shown provided with a positive reference zero line +Z. L. such that the geometric angles of the transformer-core slots 701, 702 and 703, measured counterclockwise from the positive reference zero line +Z. L., are equal to 100, 220 and 340 degrees. The phase-sequence angles associated with the transformer-core slots 701, 702 and 703, measured with respect to the zero reference phase corresponding to the positive reference zero line +Z. L., are therefore equal to half these respective geometric angles, or 50, 110 and 170 degrees, respectively. These phase-sequence angles may, of course, be associated also with the transformer-core slots 701, 702 and a further theoretical transformer-core slot 703 of Fig. 1.

The coils or windings of the sinusoidally distributed phase winding 1g, wound around the transformer-core sections or legs 711 and 712, are shown respectively provided with 0.766 and 0.174 relative numbers of turns; and no coil is shown wound around the transformer-core section or leg 713. The sums of the relative numbers of turns of the coils or windings wound around the transformer-core sections or legs 713 and 711, 711 and 712, and 712 and 713 are accordingly equal to 0.766, 0.766+0.174 or 0.940 and 0.174, respectively. These sums, equal to the relative numbers of conductors of the conductor groups disposed in the transformer-core slots 701, 702 and 703 of Figs. 1 and 9, are equal to the sines of the said phase-sequence angles 50, 110 and 170 degrees, respectively.

Referring still to Figs. 1 and 9, the sums of the relative numbers of turns of the coils or windings of the similar sinusoidally distributed phase windings 2g to 9g encircling the outermost transformer-core sections or legs 713 and 711 and the adjacently disposed transformer-core sections or legs 711 and 712 and 712 and 713, are determined in the same manner; but, of course, with the angular values associated with the respective transformer-core slots 701, 702 and 703, theoretical or actual, and with the conductor groups respectively disposed therein, decreased by the angles of phase displacement of these respective sinusoidally distributed phase windings 2g to 9g with respect to the sinusoidally distributed phase winding 1g.

The angular values associated with the conductor groups of the sinusoidally distributed phase windings 2g to 9g, wound around the transformer-core sections or legs 713 and 711, so as to be disposed in the transformer-core slot 701 of Figs. 1 and 9 are respectively 30, 10, 350, 330, 310, 290, 270 and 250 degrees. These are the phase-sequence angle 50 degrees, associated with the transformer-core 701 and the conductor groups of the sinusoidally distributed phase winding 1g disposed therein, respectively decreased by 20, 40, 60, 80, 100, 120, 140 and 160 degrees. The sums of the relative numbers of turns of the coils or windings of the sinusoidally distributed phase windings 2g to 9g, wound around the transformer-core sections or legs 713 and 711, equal to the relative numbers of conductors of the conductor groups of these sinusoidally distributed phase windings 2g to 9g disposed in the transformer-core slot 701 of Figs. 1 and 9, are therefore respectively 0.500, 0.174, 0.174, 0.500, 0.766, 0.766+0.174 or 0.940, 0.500+0.500 or 1.000 and 0.766+0.174 or 0.940, the sine of the respective angles associated with these conductor groups.

The angular values similarly associated with the conductor groups of the sinusoidally distributed phase windings 2g to 9g, wound around the transformer-core sections or legs 711 and 712, so as to be disposed in the transformer-core slot 702 of Figs. 1 and 9, are similarly respectively equal to 90, 70, 50, 30, 10, 350, 330 and 310 degrees, displaced 60 degrees with respect to the corresponding angular values associated with the transformer-core slot 701. The sums of the relative numbers of turns of the coils or windings of the sinusoidally distributed phase windings 2g to 9g, wound around the transformer-core sections or legs 711 and 712, equal to the relative numbers of conductors of the conductor groups of these sinusoidally distributed phase windings 2g to 9g disposed in the transformer-core slot 702 of Figs. 1 and 9, are therefore equal to 0.500+0.500 or 1.000, 0.766+0.174 or 0.940, 0.766, 0.500, 0.174, 0.174, 0.500 and 0.766, each the sine of the resepctive angular value.

The angular values associated with the conductor groups of the sinusoidally distributed phase windings 2g to 9g, wound around the transformer-core sections or legs 712 and 713, so as to be disposed in the transformer-core slot 703 of Figs. 1 and 9, are similarly respectively equal to 150, 130, 110, 90, 70, 50, 30 and 10 degrees. The sines, indicating the sums of the relative numbers of turns of the coils or windings of the sinusoidally distributed phase windings 2g to 9g, wound around the transformer-core sections or legs 712 and 713, as well as the relative numbers of conductors of the conductor groups of these same sinusoidally distributed phase windings 2g to 9g disposed in the transformer-core slot 703 of Figs. 1 and 9, are equal to 0.500, 0.766, 0.766+0.174 or 0.940, 0.500+0.500 or 1.000, 0.766+0.174 or 0.940, 0.766, 0.500 and 0.174, respectively.

In these Figs. 1 and 9, the series circuit of the sinusoidally distributed phase winding 1g is shown extending from a line conductor 1311, through the 0.766 coil or winding wound through the transformer-core slots 701 and 702 around the transformer-core section 711, and, by way of a conductor 1312, through the 0.174 coil or winding wound around the transformer-core section or leg 712 through the transformer-core slots 702 and 703, to a line conductor 1313. Similarly, the series circuits of the sinsoidally distributed phase windings 2g and 3g respectively extend from line conductors 1321 and 1331, through the respective 0.500 and 0.174 coils or windings wound around the transformer-core section or leg 711 through the transformer-core slots 701 and 702, and, by way of respective conductors 1322 and 1332, through the respective 0.500 and 0.766 coils or windings wound around the transformer-core section or leg 712 through the transformer-core slots 702 and 703, to respective line conductors 1323 and 1333.

The series circuits of the sinusoidally distributed phase windings 4g, 5g and 6g of Figs. 1 and 9 are shown extending from respective line conductors 1341, 1351 and 1361, through the respective 0.766, 0.500 and 0.174 coils or windings wound around the transformer-core section or leg 712 through the transformer-core slots 702 and 703, and, by way of respective conductors 1342, 1352 and 1362, through the respective 0.174, 0.500 and 0.766 coils or windings wound around the transformer-core section or leg 713 through the transformer-core slots 701 and 703, to respective line conductors 1343, 1353 and 1363.

The series circuits of the remaining sinusoidally distributed phase windings 7g, 8g and 9g of Figs. 1 and 9 are shown extending from respective line conductors 1371, 1381 and 1391, through the respective 0.174, 0.500 and 0.766 coils or windings wound around the transformer-core section or leg 711 through the transformer-core slots 701 and 702, and, by way of the respective conductors 1372, 1382 and 1392, through the respective 0.766, 0.500 and 0.174 coils or windings wound around the transformer-core section or leg 713 through the transformer-core slots 701 and 703, to respective line conductors 1373, 1383 and 1393.

In Figs. 1 and 9, for descriptive purposes, the 0.766 coils or windings are shown provided with three turns, the 0.500 coils or windings with two turns, and the 0.174 coils or windings with one turn, each turn of each coil providing one conductor to each of two transformer-core slots.

In Figs. 1 and 9, as in Figs. 2, 3 and 7, the conductors of the conductor groups that are disposed in the odd-numbered transformer-core slots and that are associated with angular values between 0 and $\pi$ or 180 degrees, and therefore, with positive values of the sine, as well as the conductors of the conductor groups that are disposed in the even-numbered transformer-core slots and that are associated with angular values between $\pi$ or 180 degrees and $2\pi$ or 360 degrees, and therefore with negative values of the sine, are wound in the positive direction down through the respective transformer-core slots. The conductor groups, the conductors of which are wound in this positive direction, are the 0.766, 0.500 and 0.174 conductor groups of the respective sinusoidally distributed phase windings 1g, 2g and 3g disposed in the transformer-core slot 701, the 0.174, 0.500 and 0.766 conductor groups of the respective sinusoidally distributed phase windings 7g, 8g and 9g disposed in the transformer-core slot 702, and all the conductor groups disposed in the transformer-core slot 703. The remaining conductor groups of Figs. 1 and 9 are either disposed in odd-numbered transformer-core slots and associated with angular values between $\pi$ or 180 degrees and $2\pi$ or 360 degrees or they are disposed in even-numbered transformer-core slots and associated with angular values between 0 and $\pi$ or 180 degrees. The conductors of these remaining conductor groups are accordingly wound in the negative direction, up through the respective transformer-core slots.

To simplify the theoretical discussion which follows, the reference lines and the corresponding reference phases have been selected to provide the transformer-core slot 703 of Figs. 1 and 9 with conductor groups associated with angular values symmetrical in the range 0 to $\pi$ or 180 degrees. The conductor groups thereby become associated with the familiar angular values 170, 150, 130, 110, 90, 70, 50, 30 and 10 degrees, and with relative numbers of conductors respectively equal to the sine values 0.174, 0.500, 0.766, 0.940, 1.000, 0.940, 0.766, 0.500 and 0.174. Furthermore, the direction of winding of all the conductors of all the conductor groups is positive.

It will be assumed, for the present, that the polyphase winding comprising the sinusoidally distributed phase windings 1g to 9g of Figs. 1 and 9 is the primary winding, and that the polyphase winding comprising the individual concentrated phase 1, phase 2 and phase 3 windings of Figs. 1 and 9 is the secondary winding. It will also be assumed that the currents in the sinusoidally distributed phase windings 1g to 9g of Figs. 1 and 9 are respectively of the same peak amplitude and the same wave form, and that they are equally phase-displaced over a total range of phase displacement of $\pi$ or 180 electric degrees.

The unit magnetomotive forces of the currents through the phase windings 1g to 9g of Figs. 1 and 9 will be referred to by the respective symbols $f_1'$ to $f_9'$, the prime mark indicating that these unit magnetomotive forces are non-sinusoidal.

The alternating magnetomotive force produced by the current through each conductor group of a sinusoidally distributed phase winding is then equal to the product of the unit magnetomotive force corresponding to that sinusoidally distributed phase winding, multiplied by the sine of the angle associated with that conductor group. These alternating magnetomotive forces will be referred to as component magnetomotive forces.

Considering first the component magnetomotive forces produced by the currents through the conductor groups disposed in the transformer-core slot 703, the non-sinusoidal component magnetomotive force $F_1'$ produced by the alternating current through the 0.174 conductor group of the sinusoidally distributed phase winding 1g is equal to the non-sinusoidal unit magnetomotive force $f_1'$ multiplied by the sine of the 170 degree angle associated with this conductor group:

$$F_1' = f_1' \sin 170°$$

Similarly, the non-sinusoidal component magnetomotive force $F_2'$ produced in the same transformer-core slot 703 by the alternating current through the 0.500 conductor group of the sinusoidally distributed phase winding 2g is $$F_2' = f_2' \sin 150°$$

and so on.

These non-sinusoidal component magnetomotive forces will add to produce a resultant or composite alternating magnetomotive force $F_R'$:

$$F_R' = F_1' + F_2' + F_3' + F_4' + F_5' + F_6' + F_7' + F_8' + F_9' \quad (9)$$

or $$F_R' = f_1' \sin 170° + f_2' \sin 150° + f_3' \sin 130° + \ldots + f_9' \sin 10°$$

Substituting for the angles in this equation their respective supplementary angles, the equation becomes:

$$F_R' = f_1' \sin 10° + f_2' \sin 30° + f_3' \sin 50° + \ldots + f_9' \sin 170° \quad (10)$$

These two Equations 9 and 10, of course, are the same as the respective Equations 1 and 2, but they represent magnetic, instead of electric, potentials.

By analysis similar to that above relating to the component voltages, therefore, it may be shown that substantially all of the harmonics of the non-sinusoidal component magnetomotive forces cancel, and that the remaining magnetomotive forces add to produce a composite magnetomotive force that is substantially sinusoidal; that this composite magnetomotive force is of the same phase as the fundamental of the component magnetomotive force contributed to the transformer-core slot 703 by the non-sinusoidal current through the sinusoidally distributed phase winding 5g; and that its relative peak amplitude is proportional to one-half the number of component magnetomotive forces or sinusoidally distributed phase windings.

In the other transformer-core slots 701 and 702 of Figs. 1 and 9, a similar cancellation of harmonics occurs, but displaced in phase to correspond to the phase displacement of the respective transformer-core slots, or the corresponding individual concentrated phase windings.

Substantially the same results are thus obtained with the transformer system of Figs. 1 and 9, as with the transformer system of Figs. 2, 3 and 7, despite the fact that the harmonics are cancelled as magnetomotive forces, rather than as induced voltages. To cancel the 5th and other higher harmonics, the transformer system of Figs. 1 and 9 should be provided with four or more sinusoidally distributed phase windings, rather than four or more individual or concentrated windings, as provided in the transformer system of Figs. 2, 3 and 7. To accomplish this object of the present invention, therefore, regardless of which transformer system is used, one of the polyphase windings should be provided with four or more phase windings, and that winding should be connected to the non-sinusoidal polyphase electric system.

In view of the substantial cancellation of the harmonics, the operation of the transformer system of Figs. 1 and 9 is substantially the same as when sinusoidal, rather than non-sinusoidal, currents flow through the various sinusoidally distributed phase windings. This operation of the sinusoidally distributed phase windings was previously discussed in connection with the description of Figs. 2, 3, 7 and 11.

The transformer system of Figs. 1 and 9, like the transformer system of Figs. 2, 3, 7 and 11, is reversible; the polyphase winding comprising the plurality of individual concentrated phase windings may be operated as the primary winding, whereupon the polyphase winding comprising the plurality of sinusoidally distributed phase windings will function as the secondary winding. From a theoretical viewpoint, the transformer systems of Figs. 1 to 3, 7, 9 and 11 are alike. An apparent difference in their function arises only because of the different numbers of magnetic circuits and of primary and secondary phase windings involved. When the number of phase windings of the sinusoidally distributed polyphase winding is large, more harmonics of the induced component magnetomotive forces become cancelled; whereas, when the number of magnetic circuits is large, more harmonics of the component voltages become cancelled. When both the number of phase windings of the sinusoidally distributed polyphase winding and the number of magnetic circuits is large, then more harmonics of both the component magnetomotive forces and the component voltages become cancelled.

In all the transformer systems heretofore described, when the polyphase winding comprising the individual concentrated windings is operated as the primary winding, the harmonics introduced by the magnetizable core appear, as in present-day transformers, in the primary currents. On the other hand, when the sinusoidally distributed polyphase winding is operated as the primary winding, harmonics introduced by the magnetizable core appear in the alternating magnetic fluxes and in the secondary voltages and currents. In the latter case, the cancellation of the induced-voltage and the primary-current-magnetomotive-force harmonics precludes the flow of the harmonic currents required for the sinusoidal excitation of the magnetizable core and for the induction of sinusoidal secondary voltages. Under load conditions, sufficient harmonic currents flow through the secondary circuits to effect substantially sinusoidal energization of the magnetizable core. These harmonic currents approach a fixed amplitude, and they therefore become a decreased portion of the total secondary current as the load upon the transformer system is increased.

In present-day practice, it is preferred that no harmonics appear in the secondary circuits. In most applications of the transformer systems of Figs. 1, 2, 3, 7, 9, 11 and 20, therefore, the polyphase winding comprising the individual concentrated windings may constitute the primary winding, and the sinusoidally distributed polyphase winding may thereupon constitute the secondary winding.

Not only is it possible to supply, by means of the transformer system of Figs. 1 and 9, many-phased voltages to a load of a corresponding large number of phases, but it is possible also to effect cancellation of harmonics introduced by the load itself, particularly if the load is an induction machine.

When the primary element of an induction machine is provided with a distributed polyphase winding, particularly a sinusoidally distributed polyphase winding, the flow of the harmonic currents required for the excitation of the induction-machine core are either blocked or restricted by the said distributed polyphase winding. Excitation harmonics accordingly appear in the alternating magnetic fluxes produced in the core of the induction machine and in the voltages induced in the individual conductors of the primary-element and secondary-element windings. If, on the other hand, the primary element of the induction machine is provided with individual concentrated windings, and sinusoidal voltages are impressed upon these windings by means of the transformer system of the present invention, the excitation harmonics then appear in the currents supplied to the induction machine, rather than in the induction machine itself. Furthermore, these harmonics cancel in the sinusoidally distributed polyphase secondary winding of the transformer system, and therefore do not appear in the currents supplied to the individual concentrated primary windings of the transformer system.

The fact that the sinusoidally distributed polyphase winding may be used either as a primary or a secondary winding leads to a further modification, shown in Fig. 5, wherein the transformer system of the present invention is provided with a primary and a secondary polyphase winding each comprising a plurality of sinusoidally distributed phase windings.

In Fig. 5, as in Fig. 1, the transformer system of the present invention is shown provided with the three-phase transformer core 708 and a primary polyphase winding comprising the sinusoidally distributed phase windings 1g to 9g. The secondary polyphase winding, however, instead of comprising individual concentrated windings, as in Fig. 1, is shown identically of the same type as the primary polyphase winding. However, in a practical machine, these primary and secondary polyphase windings of Fig. 5 need not be identical; they may be provided with different numbers of phase windings distributed with respect to different reference lines and corresponding different reference phases. Furthermore, if voltage transformation is required, the absolute numbers of turns of the primary and secondary windings may be different, even though indicated by the same relative values. These primary and secondary sinusoidally distributed polyphase windings of Fig. 5 may be connected to respective primary and secondary sinusoidal or non-sinusoidal polyphase electric systems and each will function in the manner previously explained.

In the general case of the three-phase three-legged transformer core 708, the number of conductors of any sinusoidally distributed phase winding wound in the positive direction is always equal to the number of conductors wound in the negative direction. Furthermore, the number of conductors wound in one direction through one of the transformer-core slots is always equal to the number of conductors wound in the opposite direction through the other two transformer-core slots.

Accordingly, as illustrated by the sinusoidally distributed phase windings 1g to 9g of Figs. 1 and 9 and the sinusoidally distributed phase winding 2b of Figs. 18 and 19, the conductor groups of each sinusoidally distributed phase winding may be provided by two coils or windings wound around respective transformer-core sections or legs. This number of coils or windings becomes reduced to one when, as illustrated by the sinusoidally distributed phase winding 1b of Figs. 18 and 19, one of the conductor groups is provided with a zero or 0.000 relative number of conductors, and, therefore, one of the said two coils is provided with a zero or 0.000 relative number of turns. In order to include this special case of only one coil or winding, it will be referred to hereinafter as within the expression substantially two coils or windings, it being understood that the second coil or winding has zero or 0.000 relative number of turns.

The number of actual coils of a sinusoidally distributed winding may thus be reduced by selecting a method of winding such that each coil contributes conductors to two conductor groups, and by selecting reference lines and reference phases such that as many as possible of the conductor groups have a zero or 0.000 relative number of conductors. As will be demonstrated in connection with Fig. 20, this latter method is particularly effective when the number of sinusoidally distributed phase windings is a multiple of three, the number of magnetic circuits of the transformer core 708.

Regardless of whether the number of coils of the sinusoidally distributed phase winding is either one or two, the sums of the numbers of turns of the coils wound around the transformer-core sections or legs 713 and 711, the transformer-core sections or legs 711 and 712, and the transformer-core sections or legs 712 and 713 vary as the absolute values of the sine over the total range $\pi$ or 180 degrees characteristic of a single-collection assembly, for these sums respectively represent the numbers of conductors of the conductor groups of the sinusoidally distributed phase winding disposed in the transformer-core slots 701, 702 and 703. The coils or windings respectively wound around the outermost transformer-core sections or legs 711 and 713 of the three-phase three-legged transformer core 708 of Figs. 1, 19, 20 and 21 accordingly provide the required number of conductors in the theoretical transformer-core slot 701, the coils or windings respectively wound around the outermost transformer-core section or leg 711 and the centrally disposed transformer-core section or leg 712 provide the required number of conductors in the transformer-core slot 702, and the coils or windings respectively wound around the outermost transformer-core section or leg 713 and the centrally disposed transformer-core section or leg 712 provide the required number of conductors in the transformer-core slot 703. For purposes of description, each outermost transformer-core section or leg 711 and 713 and the centrally disposed transformer-core section or leg 712 may be referred to as adjacently disposed transformer-core sections or legs of the three-phase three-legged transformer core 708.

A transformer system of the present invention embodying a three-phase three-legged core having three magnetic circuits is therefore provided with a sinusoidally distributed polyphase winding comprising a plurality of phase windings each of substantially two coils or windings wound around respective transformer-core sections or legs, and the sums of the numbers of turns of the coils or windings of each sinusoidally distributed phase winding wound around the outermost legs and adjacently disposed legs varies substantially as the absolute values of the sine over a total range substantially equal to $\pi$ or 180 degrees. The total ranges corresponding to the respective sinusoidally distributed phase windings are displaced with respect to one another respective angular amounts substantially equal to the phase displacement of the phase windings. The directions of winding of the coils of each phase winding are opposite, and the coils of each phase winding are connected in series along the said directions of winding. The above remarks, of course, are general, to include the special case, before mentioned, wherein one of the coils may be provided with a zero or 0.000 relative number of turns, and in which the direction of winding of this coil is a theoretical, rather than a practical, consideration.

Fig. 21 shows a transformer system similar to that of Fig. 19, but with the two-phase sinusoidally distributed winding in one of the many possible other geometric and electric orientations. The sinusoidally distributed phase winding 1b of Fig. 21, similar to the sinusoidally distributed phase winding 1b of Fig. 19, embodies more generally two coils or windings, instead of only the one 0.866 coil or winding of Fig. 19. These comprise a 0.174 coil or winding wound around the transformer-core section or leg 711 and a 0.766 coil or winding wound around the transformer-core section or leg 712. The sum of the relative numbers of turns of the coils of this phase winding 1b wound around the outermost transformer-core sections or legs 713 and 711, representing the relative numbers of conductors of the conductor groups disposed in the theoretical transformer-core slot 701, is therefore equal to 0.174, the sine of 10 degrees; the sum of the relative numbers of turns of the coils of this phase winding 1b wound around the adjacently disposed transformer-core sections or legs 711 and 712, representing the relative numbers of conductors of the conductor group disposed in the transformer-core slot 702, is equal to 0.174+0.766 or 0.940, the sine of 10+60 or 70 degrees; and the sum of the relative numbers of turns of the coils of this phase winding 1b wound around the adjacently disposed transformer-core sections or legs 712 and 713, representing the relative number of conductors of the conductor group disposed in the transformer-core slot 703, is equal to 0.766, the sine of 10+120 or 130 degrees. The direction of winding of the 0.174 and 0.766 coils is the same through the transformer-core slot 702, and opposite around the respective transformer-core sections or legs 711 and 712, and the coils are connected in series, in this phase winding 1b, along these directions of winding. The series circuit of this phase 1b sinusoidally distributed phase winding is shown extending from a line conductor 1501, through the 0.174 coil or winding wound around the transformer-core section or leg 711, and, by way of a conductor 1502, through the 0.766 coil or winding wound around the transformer-core section or leg 712, to a line conductor 1503.

The phase 2b sinusoidally distributed phase winding of Fig. 21 comprises a 0.342 coil or winding wound in one direction around the transformer-core section or leg 711 and a 0.643 coil or winding wound in the opposite direction around the transformer-core section or leg 713. The series circuit of the phase 2b sinusoidally distributed phase winding is shown extending from a line conductor 1504, through the 0.342 coil or winding wound around the transformer-core section or leg 711, and, by way of a conductor 1505, through the 0.643 coil or winding wound around the transformer-core section or leg 713, to a line conductor 1506. The sums of the relative numbers of turns of the coils wound around the outermost transformer-core sections or legs 713 and 711, the adjacently disposed transformer-core sections or legs 711 and 712, and the adjacently disposed transformer-core sections or legs 712 and 713 are respectively equal to 0.643+0.342 or 0.985, 0.342 and 0.643, respectively equal to the sine of 280, 340 and 40 degrees. These angles, of course, are respectively equal to the angles associated with the sums of the turns of the coils or windings of the phase 1b sinusoidally distributed phase winding wound around the outermost transformer-core sections or legs 713 and 711, the adjacently disposed transformer-core sections or legs 711 and 712, and the adjacently disposed transformer-core sections or legs 712 and 713, respectively decrease by $\pi/2$ or 90 degrees, the phase displacement of the phase 1b and phase 2b sinusoidally distributed phase windings.

The transformer system of Fig. 20 is shown provided with a nine-phase sinusoidally distributed winding comprising the phase windings 1f to 9f, very similar to the nine-phase sinusoidally distributed winding of Fig. 1 comprising the phase windings 1g to 9g. However, the nine-phase sinusoidally distributed winding of Fig. 20 is so oriented that three of the phase windings, namely, the phase windings 1f, 4f and 7f, each comprise but a single 0.866 coil or winding. Under the definition before given, of course, each of these sinusoidally distributed phase windings 1f, 4f and 7f comprises substantially two coils or windings, their other coil being provided with a zero or 0.000 relative number of turns.

The sums of the numbers of turns of the coils or windings of the sinusoidally distributed phase windings 1f to 9f, wound around the outermost transformer-core sections or legs 713 and 711, are equal to 0.000, 0.342, 0.643, 0.866, 0.643+0.342 or 0.985, 0.342+0.643 or 0.985, 0.866, 0.643 and 0.342, the absolute values of the sine of 0, 340, 320, 300, 280, 260, 240, 220 and 200 degrees, respectively. As in Fig. 19, the zero value of the phase-sequence angle is associated with the theoretical transformer-core slot 701.

The sums of the numbers of turns of the coils or windings of the sinusoidally distributed phase windings 1f to 9f, wound around the adjacently disposed transformer-core sections or legs 711 and 712 are equal to 0.866, 0.643, 0.342, 0.000, 0.342, 0.643, 0.866, 0.643+0.342 or 0.985 and 0.342+0.643 or 0.985, the absolute values of the sine of 60, 40, 20, 0, 340, 320, 300, 280 and 260 degrees, respectively. The angle 60 degrees is the phase-sequence angle associated with the transformer-core slot 702.

Similarly, the sums of the numbers of turns of the coils or windings of the sinusoidally distributed phase windings $1f$ to $9f$, wound around the adjacently disposed transformer-core sections or legs 712 and 713 are equal to 0.866, 0.643+0.342 or 0.985, 0.342+0.643 or 0.985, 0.866, 0.643, 0.342, 0.000, 0.342 and 0.643, the absolute values of the sine of 120, 100, 80, 60, 40, 20, 0, 340 and 320 degrees, respectively, the angle 120 degrees being the phase-sequence angle associated with the transformer-core slot 703.

In Fig. 20, the series phase-winding circuits of the sinusoidally distributed phase windings $1f$, $4f$ and $7f$ are shown extending from line conductors 1511, 1541 and 1571, through the 0.866 coils or windings wound around the transformer-core sections or legs 712, 713 and 711, to line conductors 1512, 1542 and 1572, respectively. The series phase-winding circuits of the sinusoidally distributed phase windings $2f$ and $3f$, on the other hand, extend from line conductors 1521 and 1531, through the 0.643 and 0.342 coils wound around the transformer-core section or leg 712, and, by way of conductors 1522 and 1532, through the 0.342 and 0.643 coils or windings wound around the transformer-core section or leg 713, to line conductors 1523 and 1533, respectively. Similarly, the series phase-winding circuits of the sinusoidally distributed phase windings $5f$ and $6f$ extend from line conductors 1551 and 1561, through the 0.342 and 0.643 coils wound around the transformer-core section or leg 711, and, by way of the conductors 1552 and 1562, through the 0.643 and 0.342 coils or windings wound around the transformer-core section or leg 713, to line conductors 1553 and 1563, respectively. Finally, the series phase-winding circuits of the sinusoidally distributed phase windings $8f$ and $9f$ extend from line conductors 1581 and 1591, through the 0.643 and 0.342 coils or windings wound around the transformer-core section or leg 711, and, by way of conductors 1582 and 1592, through the 0.342 and 0.643 coils or windings wound around the transformer-core section or leg 712, to line conductors 1583 and 1593, respectively.

Thus, in Figs. 19 and 20, the respective two-phase and nine-phase sinusoidally distributed windings are oriented to require a minimum number of coils. Figs. 1 and 5, on the other hand, are illustrative of the arrangements wherein each phase winding is comprised of two series-connected coils. As illustrated by Figs. 1, 5 and 18 to 21, the transformer system embodying a three-phase three-legged core may be provided with a sinusoidally distributed polyphase winding comprising any desired number of phase windings, and it may be in any desired geometric and electric orientation. In Figs. 19 and 21, the number of phase windings is two, and, in Figs. 1, 5 and 20, the number is nine However, as previously explained, four or more sinusoidally distributed phase windings are required to effect cancellation of magnetomotive-force harmonics above the third.

Though the present invention has been described herein as applicable to a transformer system, the sinusoidally distributed polyphase winding thereof is applicable for use also in other polyphase electric machines. Such uses include polyphase rotating-magnetic-pattern-type synchronous and induction machines respectively described in further applications, Serial No. 395,972, filed December 3, 1953 and Serial No. 469,394, filed November 17, 1954.

Only a few of the many possible modifications of the present invention have been described herein. Further modifications will occur to persons skilled in the art, and all such are intended to be included within the spirit and the scope of the invention, as defined in the appended claims.

What is claimed is:

1. A polyphase electromagnetic system having, in combination, means for producing a magnetic system comprising an assembly of one or more collections each of substantially the same number of magnetic circuits, a polyphase winding comprising a plurality of phase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing alternately with, and with the negative of, the sign of the said sine, and the conductor groups of the respective phase windings being connected in series along the said directions of winding.

2. A polyphase electromagnetic system having, in combination, means for producing a magnetic system of a plurality of magnetic circuits, comprising an assembly of one or more collections each of substantially the same number of magnetic circuits, a polyphase winding comprising a plurality of phase windings each having a number of conductor groups substantially equal to the number of magnetic circuits of the assembly of magnetic circuits, one of the said pluralities being equal to four or more, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing alternately with, and with the negative of, the sign of the said sine, and the conductor groups of the respective phase windings being connected in series along the said directions of winding.

3. A polyphase electromagnetic system having, in combination, means for producing a magnetic system of substantially equiangularly spaced magnetic circuits, comprising an assembly of one or more collections each of substantially the same number of magnetic circuits, a polyphase winding comprising a plurality of phase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing alternately with, and with the negative of, the sign of the said sine, and the conductor groups of the respective phase windings being connected in series along the said directions of winding.

4. A polyphase electromagnetic system having, in combination, means for producing a magnetic system of a plurality of substantially equiangularly spaced magnetic circuits, comprising an assembly of one or more collections each of substantially the same number of magnetic circuits, a polyphase winding comprising a plurality of phase windings each having a number of conductor groups substantially equal to the number of magnetic circuits of the assembly of magnetic circuits, one of the said pluralities being equal to four or more, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing alternately with, and with the negative of, the sign of the said sine, and the conductor groups of the respective phase windings being connected in series along the said directions of winding.

5. A polyphase electromagnetic system having, in combination, magnetizable-core means provided with an assembly of one or more collections each of substantially the same number of slots, a polyphase winding comprising a plurality of phase windings each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said sine, and the conductor groups of the respective phase windings being connected in series along the said directions of winding.

6. A polyphase electromagnetic system having, in combination, magnetizable-core means provided with a plurality of slots, comprising an assembly of one or more collections each of substantially the same number of slots, a polyphase winding comprising a plurality of phase windings each having a number of conductor groups substantially equal to the number of slots of the assembly of slots, one of the said pluralities being equal to four or more, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said sine, and the conductor groups of the respective phase windings being connected in series along the said directions of winding.

7. A polyphase electromagnetic system having, in combination, magnetizable-core means provided with an assembly of one or more collections each of substantially the same number of slots substantially equiangularly spaced along the circumference of a circle, a polyphase winding comprising a plurality of phase windings each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said sine, and the conductor groups of the respective phase windings being connected in series along the said directions of winding.

8. A polyphase electromagnetic system having, in combination, magnetizable-core means provided with a plurality of substantially equiangularly spaced slots, comprising an assembly of one or more collections each of substantially the same number of slots, a polyphase winding comprising a plurality of phase windings each having a number of conductor groups substantially equal to the number of slots of the assembly of slots, one of the said pluralities being equal to four or more, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said sine, and the conductor groups of the respective phase windings being connected in series along the said directions of winding.

9. A polyphase electromagnetic system for connection to an electric system of a plurality of phases, having, in combination, means for producing a magnetic system comprising an assembly of one or more collections each of substantially the same number of magnetic circuits, means for supplying a component magnetomotive force from and corresponding to each phase of the polyphase electric system to, and inducing a component voltage for and corresponding to each phase of the polyphase electric system in each magnetic circuit of the assembly of magnetic circuits, the peak amplitudes of the component magnetomotive forces and the component voltages corresponding to the respective phases of the polyphase electric system being substantially proportional to the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phases of the polyphase electric system, the polarities of the component magnetomotive forces and the component voltages corresponding to each phase of the polyphase electric system changing alternately with, and with the negative of, the sign of the said sine, and means for combining the component voltages, in the said polarities, into composite voltages, one corresponding to each phase of the polyphase electric system.

10. A polyphase transformer system having, in combination, means for producing a magneto system comprising an assembly of one or more collections each of substantially the same number of magnetic circuits, primary and secondary polyphase windings one of which comprises a plurality of phase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings the directions of winding of the conductors of the conductor groups of each phase winding changing alternately with, and with the negative of, the sign of the said sine, the conductor groups of the respective phase windings being connected in series along the said directions of winding, the other polyphase winding comprising a plurality of substantially like phase windings wound through the magnetic circuits, and means cooperating with the said other polyphase winding to produce substantially like magnetomotive forces of alternately opposite polarity in the magnetic circuits, the magnetomotive forces being substantially equally phase-displaced, disregarding the alternately opposite polarity, over the said total range.

11. A polyphase transformer system having, in combination, means for producing a magnetic system comprising an assembly of one or more collections each of substantially the same number of magnetic circuits, primary and secondary polyphase windings each of which comprises a plurality of phase windings, the plurality of phase windings of one of the polyphase windings being four or more, the phase windings of one polyphase winding each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing alternately with, and with the negative of, the sign of the said sine, the conductor groups of the respective phase windings being connected in series along the said directions of winding, the other polyphase winding comprising a plurality of substantially like phase windings wound through the magnetic circuits, and means cooperating with the said other polyphase winding to produce substantially like magnetomotive forces of alternately opposite polarity in the magnetic circuits, the magnetomotive forces being substantially equally phase-displaced, disregarding the alternately opposite polarity, over the said total range.

12. A polyphase transformer system having, in combination, means for producing a magnetic system comprising an assembly of one or more collections each of substantially the same number of magnetic circuits, primary and secondary polyphase windings each comprising a plurality of phase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges of the respective polyphase windings being displaced with respect to one another respective angular amounts substantially equal to the phase displacement of the phases of the respective polyphase windings, the directions of winding of the conductors of the conductor groups of each phase winding changing alternately with, and with the negative of, the sign of the said sine, and the conductor groups of the respective phase windings being connected in series along the said directions of winding.

13. A polyphase transformer system having, in combination, a magnetizable core provided with an assembly of one or more collections each of substantially the same number of slots, primary and secondary polyphase windings one of which comprises a plurality of phase windings each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said sine, the conductor groups of the respective phase windings being connected in series along the said directions of winding, the other polyphase winding comprising a plurality of substantially like phase windings wound through the slots, and means cooperating with the said other polyphase winding to produce substantially like magnetomotive forces of alternately opposite polarity in the magnetic circuits surrounding the slots, the magnetomotive forces being substantially equally phase-displaced, disregarding the alternately opposite polarity, over the said total range.

14. A polyphase transformer system having, in combination, a magnetizable core provided with an assembly of one or more collections each of substantially the same number of slots, primary and secondary polyphase windings each of which comprises a plurality of phase windings, the plurality of phase windings of one of the polyphase windings being four or more, the phase windings of one polyphase winding each having a number of conductor groups substantially equal to the number of slots of the assembly of slots, a conductor group of each phase winding being disposed substantially in each slot, the numbers of conductors of the conductor groups of each phase winding vary substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said sine, the conductor groups of the respective phase windings being connected in series along the said directions of winding, the other polyphase winding comprising a plurality of substantially like phase windings wound through the slots, and means cooperating with the said other polyphase winding to produce substantially like magnetomotive forces of alternately opposite polarity in the magnetic circuits surrounding the slots, the magnetomotive forces being substantially equally phase-displaced, disregarding the alternately opposite polarity, over the said total range.

15. A polyphase transformer system having, in combination, a magnetizable core provided with an assembly of one or more collections each of substantially the same number of slots, primary and secondary polyphase windings each of which comprises a plurality of phase windings each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges of the respective polyphase windings being displaced with respect to one another respective angular amounts substantially equal to the phase displacement of the phases of the respective polyphase windings, the directions of winding of the conductors of the conductor groups of each phase winding changing alternately with, and with the negative of, the sign of the said sine, and the conductor groups of the respective phase windings being connected in series along the said directions of winding.

16. A polyphase transformer system having, in combination, a magnetizable core provided with an assembly of one or more collections each of substantially the same number of slots substantially equiangularly spaced along the circumference of a circle, primary and secondary polyphase windings one of which comprises a plurality of phase windings each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said sine, the conductor groups of the respective phase windings being connected in series along the said directions of winding, the other polyphase winding comprising a plurality of substantially like phase windings wound through the slots, and means cooperating with the said other polyphase winding to produce substantially like magnetomotive forces of alternately opposite polarity in the magnetic circuits surrounding the slots, the magnetomotive forces being substantially equally phase-displaced, disregarding the alternately opposite polarity, over the said total range.

17. A polyphase transformer system having, in combination, a magnetizable core provided with an assembly of one or more collections each of substantially the same number of slots substantially equiangularly spaced along the circumference of a circle, primary and secondary polyphase windings each of which comprises a plurality of phase windings, the plurality of phase windings of one of the polyphase windings being four or more, the phase windings of one polyphase winding each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said sine, the conductor groups of the respective phase windings being connected in series along the said directions of winding, the other polyphase winding comprising a plurality of substantially like phase windings wound through the slots, and means cooperating with the said other polyphase winding to produce substantially like magnetomotive forces of alternately opposite polarity in the magnetic circuits surrounding the slots, the magnetomotive forces being substantially equally phase-displaced, disregarding the alternately opposite polarity, over the said total range.

18. A polyphase transformer system having, in combination, a magnetizable core provided with an assembly of one or more collections each of substantially the same number of slots substantially equiangularly spaced along the circumference of a circle, primary and secondary polyphase windings each of which comprises a plurality of phase windings each having a number of conductor groups substantially equal to the number of slots of the assembly of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges of the respective polyphase windings being displaced with respect to one another respective angular amounts substantially equal to the phase displacement of the phases of the respective polyphase windings, the directions of winding of the conductors of the conductor groups of each phase winding changing alternately with, and with the negative of, the sign of the said sine, and the conductor groups of the respective phase windings being connected in series along the said directions of winding.

19. A polyphase transformer system for connection between primary and secondary polyphase electric systems having, in combination, means for producing a magnetic system comprising an assembly of one or more collections each of substantially the same number of magnetic circuits, means for supplying a component magnetomotive force from and corresponding to each phase of each polyphase electric system to, and inducing a component voltage for and corresponding to each phase of each polyphase electric system in each magnetic circuit of the assembly of magnetic circuits, the peak amplitudes of the component magnetomotive forces and the component voltages corresponding to the respective phases of each polyphase electric system being substantially proportional to the absolute values of the sine over a total range substantially equal to 180 degrees multiplied by the number of collections of magnetic circuits at angular increments each substantially equal to the said total range divided by the number of magnetic circuits, the respective total ranges corresponding to the respective polyphase electric systems being displaced with respect to one another respective angular amounts substantially equal to the phase displacement of the phases of the respective polyphase electric systems, the polarities of the component magnetomotive forces and the component voltages corresponding to each phase of each of the respective polyphase electric systems changing alternately with, and with the negative of, the sign of the said sine, and means for combining the component voltages, in the said polarities, into composite voltages, one corresponding to each phase of each of the respective polyphase electric systems.

20. A polyphase transformer system having, in combination, a magnetizable core having two outermost legs and a third leg, each outermost leg and the third leg constituting adjacently disposed legs, primary and secondary polyphase windings one of which comprises a plurality of phase windings each having substantially two series-connected coils wound in opposite directions around respective legs, the sums of the numbers of turns of the coils of each phase winding wound around the two outermost legs and each two adjacently disposed legs varying substantially as the absolute values of the sine over a total range substantially equal to 180 degrees at angular increments each equal to 60 degrees, the respective total ranges being displaced with respect to one another respective angular amounts substantially equal to the phase displacement of the phase windings, the other polyphase winding comprising substantially like phase windings wound around the legs, and means cooperating with the other polyphase winding to produce substantially like magnetic fluxes of alternately opposite polarity in the legs, the magnetic fluxes being substantially equally phase-displaced, disregarding the alternately opposite polarity, over the said total range.

21. A polyphase transformer system having, in combination, a magnetizable core having two outermost legs and a third leg, each outermost leg and the third leg constituting adjacently disposed legs, primary and secondary polyphase windings one of which comprises four or more phase windings each having substantially two series-connected coils wound in opposite directions around respective legs, the sums of the numbers of turns of the coils of each phase winding wound around the two outermost legs and each two adjacently disposed legs varying substantially as the absolute values of the sine over a total range substantially equal to 180 degrees at angular increments each equal to 60 degrees, the respective total ranges being displaced with respect to one another respective angular amounts substantially equal to the phase displacement of the phase windings, the other polyphase winding comprising substantially like phase windings wound around the legs, and means cooperating with the other polyphase winding to produce substantially like magnetic fluxes of alternately opposite polarity in the legs, the magnetic fluxes being substantially equally phase-displaced, disregarding the alternately opposite polarity, over the said total range.

22. A polyphase transformer system having, in combination, a magnetizable core having two outermost legs and a third leg, each outermost leg and the third leg constituting adjacently disposed legs, primary and secondary polyphase windings each of which comprises a plurality of phase windings each having substantially two series-connected coils wound in opposite directions around respective legs, the sums of the numbers of turns of the coils of each phase winding of each polyphase winding wound around the two outermost legs and each two adjacently disposed legs varying substantially as the absolute values of the sine over a total range substantially equal to 180 degrees at angular increments each equal to 60 degrees, and the respective total ranges of the respective polyphase windings being displaced with respect to one another respective angular amounts substantially equal to the phase displacement of the phases of the respective polyphase windings.

23. A polyphase transformer system having, in combination, a magnetizable core having two outermost legs and a third leg, each outermost leg and the third leg constituting adjacently disposed legs, primary and secondary polyphase windings one of which comprises two phase windings each having substantially two series-connected coils wound in opposite directions around respective legs, the sums of the numbers of turns of the coils of each phase winding wound around the two outermost legs and each two adjacently disposed legs varying substantially as the absolute values of the sine over a total range substantially equal to 180 degrees at angular increments each equal to 60 degrees, the respective total ranges being displaced 90 degrees, the other polyphase winding comprising substantially like phase windings wound around the legs, and means cooperating with the other polyphase winding to produce substantially like magnetic fluxes of alternately opposite polarity in the legs, the magnetic fluxes being substantially equally phase-displaced, disregarding the alternately opposite polarity, over the said total range.

24. A polyphase transformer system having, in combination, a magnetizable core having three legs, primary and secondary polyphase windings, one of the polyphase windings comprising two phase windings one of which comprises two series-connected coils respectively wound in opposite directions around two of the legs and the other of which has a third coil wound around the third leg, the two coils and the third coil having relative numbers of turns in the ratio of substantially 0.500:0.500:0.866, the other polyphase winding comprising substantially like phase windings wound around the legs, and means cooperating with the other polyphase winding to produce substantially like magnetic fluxes of alternately opposite polarity in the legs, the magnetic fluxes being substantially equally phase-displaced, disregarding the alternately opposite polarity, over the said total range.

25. A polyphase electromagnetic system having, in combination, means for producing a magnetic system comprising an assembly of one or more collections each of substantially the same number of magnetic circuits, a polyphase winding comprising a plurality of phase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing alternately with, and with the negative of, the sign of the said alternating function, and the conductor groups of the respective phase windings being connected in series along the said directions of winding.

26. A polyphase electromagnetic system having, in combination, magnetizable-core means provided with an assembly of one or more collections each of substantially the same number of slots equiangularly spaced along the circumference of a circle, a polyphase winding comprising a plurality of phase windings each having a number of conductor groups substantially equal to the number of slots of the assembly of slots, a conductor group of each phase winding being disposed substantially in each slot, the numbers of conductors of the conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said alternating function, and the conductor groups of the respective phase windings being connected in series along the said directions of winding.

27. A polyphase transformer system having, in combination, means for producing a magnetic system comprising an assembly of one or more collections each of substantially the same number of magnetic circuits, primary and secondary polyphase windings one of which comprises a plurality of phase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing alternately with, and with the negative of, the sign of the said alternating function, the conductor groups of the respective phase windings being connected in series along the said directions of winding, the other polyphase winding comprising a plurality of substantially like phase windings wound through the magnetic circuits, and means cooperating with the said other polyphase winding to produce substantially like magnetomotive forces of alternately opposite polarity in the magnetic circuits, the magnetomotive forces being substantially equally phase-displaced, disregarding the alternately opposite polarity, over the said total range.

28. A polyphase transformer system having, in combination, a magnetizable core having two outermost legs and a third leg, each outermost leg and the third leg constituting adjacently disposed legs, primary and secondary polyphase windings one of which comprises a plurality of phase windings each having substantially two series-connected coils wound in opposite directions around respective legs, the sums of the numbers of turns of the coils of each phase winding wound around the two outermost legs and each two adjacently disposed legs varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees at angular increments each equal to 60 degrees, the respective total ranges being displaced with respect to one another respective angular amounts substantially equal to the phase displacement of the phase windings, the other polyphase winding comprising substantially like phase windings wound around the legs, and means cooperating with the other polyphase winding to produce substantially like magnetic fluxes of alternately opposite polarity in the legs, the magnetic fluxes being substantially equally phase-displaced, disregarding the alternately opposite polarity, over the said total range.

References Cited in the file of this patent

FOREIGN PATENTS

| | | |
|---|---|---|
| 644,676 | Great Britain | Oct. 18, 1950 |
| 656,655 | Great Britain | Aug. 29, 1951 |